(12) United States Patent
Johan

(10) Patent No.: US 10,001,914 B2
(45) Date of Patent: Jun. 19, 2018

(54) METHOD AND APPARATUS FOR CAUSING A DEFORMATION REPRESENTATION

(71) Applicant: Nokia Technologies Oy, Espoo (FI)

(72) Inventor: Kildal Johan, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 467 days.

(21) Appl. No.: 13/848,708

(22) Filed: Mar. 21, 2013

(65) Prior Publication Data

US 2014/0285417 A1  Sep. 25, 2014

(51) Int. Cl.
*G06F 3/045*  (2006.01)
*G06F 3/0488* (2013.01)
*G06F 1/16*   (2006.01)

(52) U.S. Cl.
CPC .......... *G06F 3/0488* (2013.01); *G06F 1/1652* (2013.01); *G06F 1/1694* (2013.01); *G06F 2203/04102* (2013.01)

(58) Field of Classification Search
CPC .... G06F 3/03547; G06F 3/041; G06F 3/0412; G06F 3/0414; G06F 3/046; G06F 3/047; G06F 3/044; G06F 3/045; G06F 2203/041; G06F 2203/04102; G06F 3/0488; G06F 1/1652; G06F 1/1694
See application file for complete search history.

(56) References Cited

U.S. PATENT DOCUMENTS

| | | | | |
|---|---|---|---|---|
| 2003/0227441 A1* | 12/2003 | Hioki | .................... | G06F 3/0412 345/156 |
| 2009/0085879 A1* | 4/2009 | Dai | ....................... | G06F 1/1626 345/173 |
| 2009/0322695 A1* | 12/2009 | Cho | ...................... | G06F 3/0416 345/173 |
| 2010/0011291 A1 | 1/2010 | Nurmi | | |
| 2010/0079395 A1* | 4/2010 | Kim | ...................... | G06F 1/1626 345/173 |
| 2011/0063235 A1* | 3/2011 | Yu et al. | ....................... | 345/173 |
| 2011/0267294 A1 | 11/2011 | Kildal | | |
| 2012/0259578 A1* | 10/2012 | Bevilacqua | ........... | G06F 1/1694 702/141 |

(Continued)

FOREIGN PATENT DOCUMENTS

| | | |
|---|---|---|
| CN | 102025814 A | 4/2011 |
| EP | 0929027 A2 | 7/1999 |
| EP | 2458829 A2 | 5/2012 |

OTHER PUBLICATIONS

International Search Report and Written Opinion of the International Searching Authority for corresponding Patent Cooperation Treaty Application No. PCT/US2014/031513, dated Jun. 6, 2014, 12 pages.

(Continued)

*Primary Examiner* — Lun-Yi Lao
*Assistant Examiner* — Jarurat Suteerawongsa
(74) *Attorney, Agent, or Firm* — Banner & Witcoff, Ltd.

(57) ABSTRACT

A method comprising determining a deformation attribute of an apparatus based, at least in part, on at least one operational parameter, receiving an indication of an acceleration input that corresponds to the deformation attribute, and causing a deformation representation of the apparatus, the deformation representation being indicative of the deformation attribute in relation to the acceleration input is disclosed.

19 Claims, 17 Drawing Sheets

(56) References Cited

U.S. PATENT DOCUMENTS

2012/0260220 A1* 10/2012 Griffin ............... G06F 3/033
 715/863
2013/0145295 A1* 6/2013 Bocking ............. G06F 3/017
 715/764
2014/0143682 A1* 5/2014 Druck ............... G06Q 10/107
 715/752

OTHER PUBLICATIONS

Bicchi, Antonio, et al., "Haptic Interfaces Based on Magnetorheological Fluids," Proc.2th Int. Conf. Eurohaptics, Jul. 2002, pp. 6-11.

Follmer, Sean, et al., "Jamming User Interfaces: Programmable Particle Stiffness and Sensing for Malleable and Shape-Changing Devices," Proceedings of the 25 Annual ACM Symposium on User Interface Software and Technology, Oct. 7-10, 20012, pp. 519-528.

Ishii, Hiroshi, et al, "Radical Atoms: Beyond Tangible Bits, Toward Transformable Materials," Interactions, Jan./Feb. 2012, pp. 38-51.

Jacob, Robert J.K., et al., "Reality-Based Interaction: A Framework for Post-WIMP Interfaces," Proceedings of the SIGCHI Conference on Human Factors in Computer Systems, Apr. 5-10, 2008, pp. 201-210.

Kildal, Johan, "3D-Press: Haptic Illusion of Compliance When Pressing on a Rigid Surface," International Conference on Multimodal Interfaces and the Workshop on Machine Learning for Multimodal Interaction, 2010, 8 pages.

Nakagawa, Yusuke, et al., "MimicTile: A Variable Stiffness Deformable User Interface for Mobile Devices," Proceedings of the SIGCHI Conference on Human Factors in Computer Systems, May 5-10, 2012, pp. 745-748.

Sep. 28, 2017 (CN) First Chinese Office Action—App 201480024170.1.

* cited by examiner

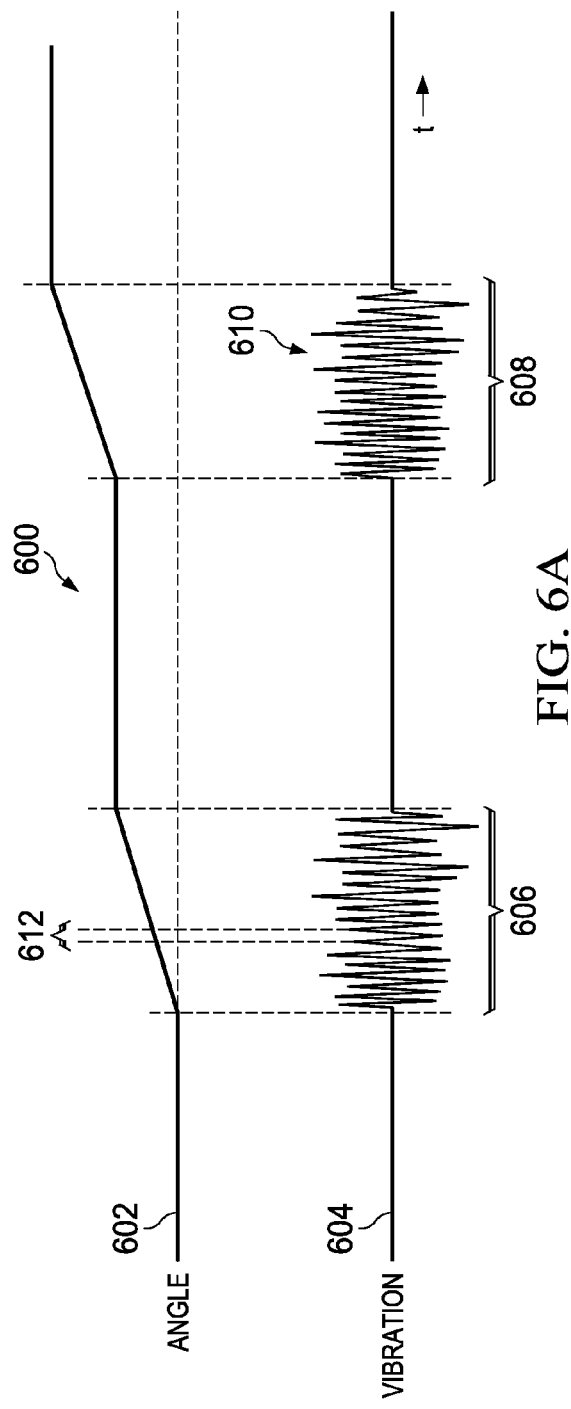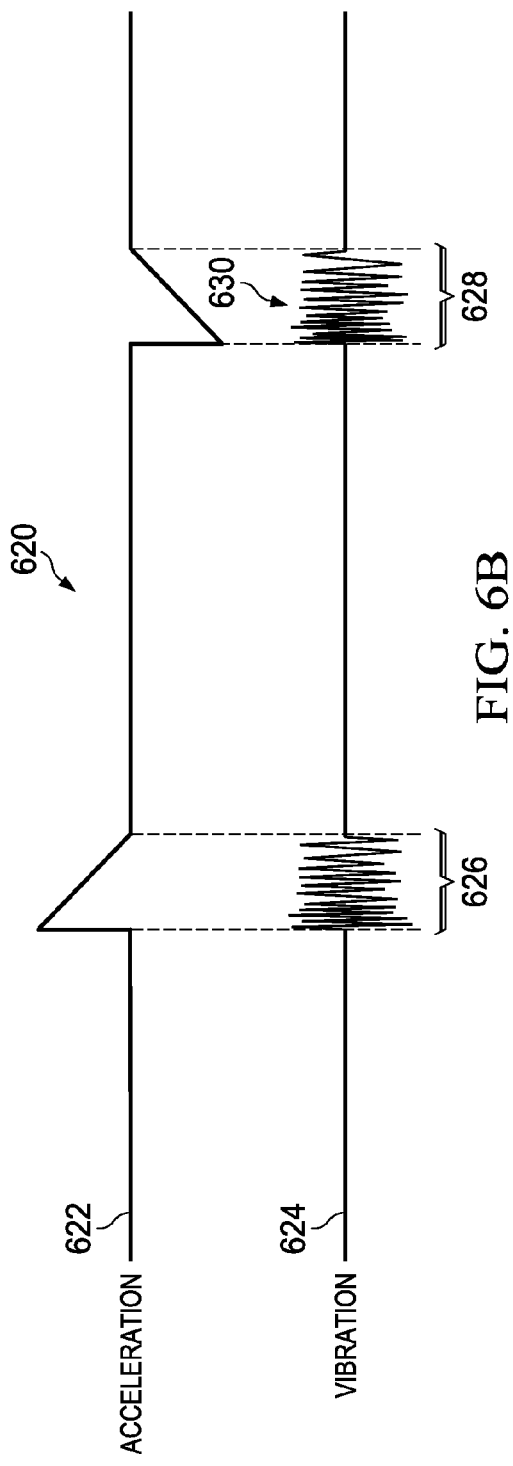

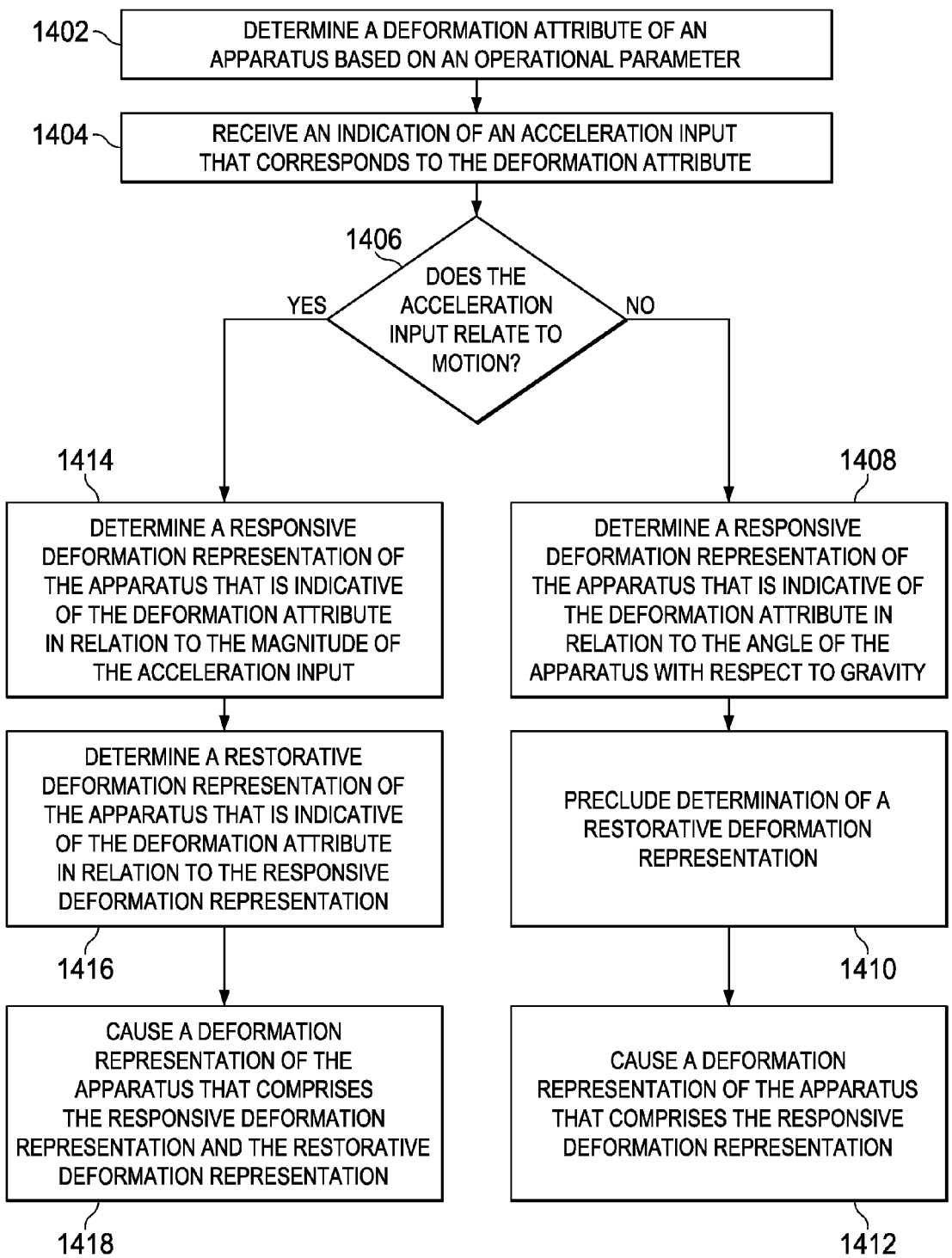

METHOD AND APPARATUS FOR CAUSING A DEFORMATION REPRESENTATION

TECHNICAL FIELD

The present application relates generally to representing apparatus deformation.

BACKGROUND

As electronic apparatuses have expanded their role in the lives of their users, there has been an increasing concern about the attention that electronic apparatus demand from their users. For example, apparatus interaction is often seen as a breach of etiquette in many social situations. In another example, dependency on a display may cause the user to become dangerously distracted. For example, in many jurisdictions, it is illegal to operate a mobile apparatus while driving a vehicle. In addition, there are numerous reports of pedestrian injuries and mishaps associated with users being distracted by the display of an electronic apparatus. Under such circumstances, it may be desirable for a user to be able to interact with the electronic apparatus without such a high reliance on the display.

SUMMARY

Various aspects of examples of the invention are set out in the claims.

One or more embodiment provide for an apparatus, a method, a computer readable medium, a computer program product, and/or the like, for determining a deformation attribute of an apparatus based, at least in part, on at least one operational parameter, receiving an indication of an acceleration input that corresponds to the deformation attribute, and causing a deformation representation for the apparatus, the deformation representation being indicative of the deformation attribute in relation to the acceleration input.

One or more embodiment provide for an apparatus, a method, a computer readable medium, a computer program product, and/or the like, comprising means for determining a deformation attribute of an apparatus based, at least in part, on at least one operational parameter, means for receiving an indication of an acceleration input that corresponds to the deformation attribute, and means for causing a deformation representation for the apparatus, the deformation representation being indicative of the deformation attribute in relation to the acceleration input.

In at least one example embodiment, the deformation attribute is associated with a deformation classification.

In at least one example embodiment, the deformation classification corresponds to at least one of: a compression deformation classification, a tensile deformation classification, a torsion deformation classification, a flexural deformation classification.

In at least one example embodiment, the deformation attribute is associated with at least one deformation direction.

One or more example embodiments further perform determining another deformation attribute based, at least in part, on at least one other operational parameter, the other operational parameter being different than the operational parameter.

One or more example embodiments further perform causing another deformation representation, the other deformation representation being indicative of the other deformation attribute.

In at least one example embodiment, the deformation attribute is associated with a deformation classification and the other deformation attribute is associated with another deformation classification, the deformation classification being different than the other deformation classification.

In at least one example embodiment, the deformation attribute is associated with a deformation direction and the other deformation attribute is associated with another deformation direction, the deformation direction being different than the other deformation direction.

In at least one example embodiment, the at least one operational parameter relates to at least one of: a battery charge, a signal strength, a memory availability, a number of unread messages, a distance to a navigation location, a position in a song, and an exercise performance criteria.

In at least one example embodiment, the deformation representation comprises a simulation of a deformation of the apparatus.

In at least one example embodiment, the simulation of structural property relates to simulation of rigidity.

In at least one example embodiment, the deformation representation is associated with a deformation classification.

In at least one example embodiment, the deformation classification corresponds to at least one of: a compression deformation classification, a tensile deformation classification, a torsion deformation classification, a flexural deformation classification.

In at least one example embodiment, the deformation representation is associated with at least one deformation direction.

In at least one example embodiment, the deformation attribute comprises a deformation magnitude, wherein determination of the deformation attribute comprises determining the deformation magnitude based, at least in part, on a value of the operational parameter.

In at least one example embodiment, the deformation representation relates to a deformation representational magnitude, the deformation representational magnitude being proportional to the deformation magnitude. (need support for explicit determination)

In at least one example embodiment, the deformation magnitude relates to resistive force.

One or more example embodiments further perform determining that the value of the operational parameter has changed.

One or more example embodiments further perform determining a changed deformation magnitude based, at least in part, on the changed value of the operational parameter.

One or more example embodiments further perform causing a changed deformation representation for the apparatus, the changed deformation representation being indicative of the changed deformation magnitude.

One or more example embodiments further perform determining that the acceleration input corresponds to the deformation attribute.

In at least one example embodiment, causation of the deformation representation is caused by determination that the acceleration input corresponds to the deformation attribute.

One or more example embodiments further perform determining an inertial force associated with the acceleration input.

In at least one example embodiment, the deformation representation comprises a responsive deformation representation.

In at least one example embodiment, the responsive deformation representation relates to a deformation representation in an opposite direction to the acceleration input.

In at least one example embodiment, the responsive deformation representation relates to a deformation representation having a magnitude that is proportional to a magnitude of the acceleration input and a magnitude of the deformation attribute.

In at least one example embodiment, the duration of the responsive deformation representation coincides with duration of the acceleration input.

In at least one example embodiment, the deformation representation comprises a restorative deformation representation.

In at least one example embodiment, the restorative deformation representation relates to a deformation representation in an opposite direction to a responsive deformation representation.

In at least one example embodiment, the restorative deformation representation relates to a deformation representation having a magnitude that is proportional to a magnitude of the responsive deformation representation and a magnitude of the deformation attribute.

In at least one example embodiment, the restorative deformation duration is proportional to a magnitude of the responsive deformation representation and a magnitude of the deformation attribute.

One or more example embodiments further perform determining that the acceleration input relates to motion, wherein the restorative deformation representation is predicated on the determination that the acceleration input relates to motion.

In at least one example embodiment, the acceleration input relates to motion.

In at least one example embodiment, the acceleration input relates to gravity.

One or more example embodiments further perform determining that the acceleration input fails to relate to motion.

One or more example embodiments further perform preclusion of a restorative deformation representation.

In at least one example embodiment, a magnitude of the deformation representation is based, at least in part, on an angle associated with the acceleration input.

BRIEF DESCRIPTION OF THE DRAWINGS

For a more complete understanding of embodiments of the invention, reference is now made to the following descriptions taken in connection with the accompanying drawings in which:

FIGS. 6A-6C are diagrams illustrating models associated with simulation of a deformation according to at least one example embodiment;

FIG. 14 is a flow diagram illustrating activities associated with causing a deformation representation according to at least one example embodiment.

DETAILED DESCRIPTION OF THE DRAWINGS

Figure 1:
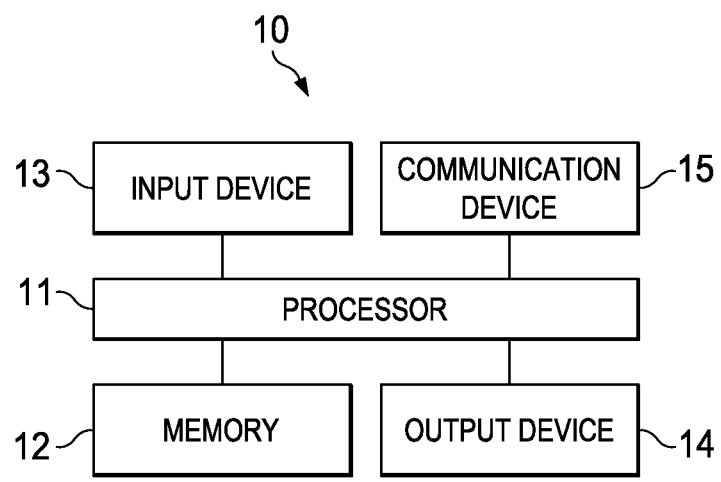
FIG. 1 is a block diagram showing an apparatus according to at least one example embodiment.

An embodiment of the invention and its potential advantages are understood by referring to FIGS. 1 through 14 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise as an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
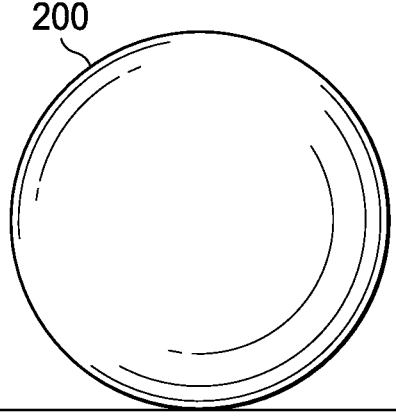
FIGS. 2A-2C are diagrams illustrating a conceptual metaphor for a deformation representation with respect to an operation parameter according to at least one example embodiment.
Figure 2B:
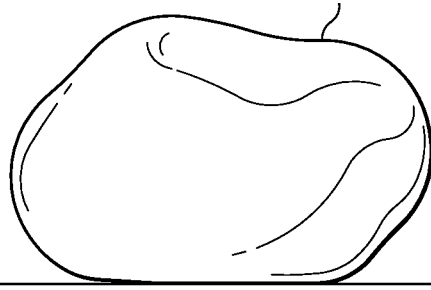
Figure 2C:
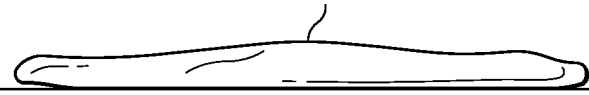

FIGS. 2A-2C are diagrams illustrating a conceptual metaphor for a deformation representation with respect to an operation parameter according to at least one example embodiment. The examples of FIGS. 2A-2C are merely examples of a conceptual metaphor, and do not limit the scope of the claims. For example, one or more properties of deformation may vary, correlation between operation parameter and deformation may vary, and/or the like.

A challenge faced by users in utilization of apparatus interaction, without utilization of a display, is understanding the meaning of cues that are absent visual interaction. This challenge is further increased in cues that are further absent of audible interaction. However, it may be desirable to provide interaction with an apparatus absent audio interaction and absent visual interaction to reduce the obtrusiveness of the apparatus interaction. Under such circumstances, it may be desirable for the non-visual non-audible interaction to relate to a metaphor that the user can readily associate with the information being communicated by the interaction. For example, a strong metaphor may allow a user to learn the non-visual non-audible interaction quickly, to make fewer errors associated with the interaction, to save power associated with repetition of interaction due to erroneous interaction, and/or the like. The benefits of such a metaphor may be further increased when the interaction associated with the metaphor is a frequent interaction performed by the user.

One such interaction that may benefit from non-visual, non-audible interaction may be the communication of one or more operation parameters from the apparatus to the user. An operation parameter relates to information regarding the operation of, at least an aspect of, the apparatus. For example, an operation parameter may relate to a battery charge, a signal strength, a memory availability, a number of unread messages, a distance to a navigation location, a position in a song, and an exercise performance criteria. For example, an operation parameter may relate to a battery charge by way of representing a status of battery charge, such as an indication of how much charge is left in the battery, whether or not the battery is charging, and/or the like. In another example, an operation parameter may relate to a signal strength, such as a wireless local area network signal strength, a cellular signal strength, and/or the like, by way of an indication regarding how strong a signal is, whether or not a signal is being received, and/or the like. In another example, an operation parameter may relate to memory availability, by way of an indication regarding a percentage of available memory, a percentage of used memory, a quantity of available memory, a quantity of used memory, and/or the like. In another example, an operation parameter may relate to a distance to a navigation location, such as a point of interest, a location associated with a navigation instruction, etc. In another example, an operation parameter may relate to a position in a song, such a percentage of a song already played, percentage of a song remaining to be played, duration of song already played, duration of song remaining to be played, and/or the like. In another example, an operation parameter may relate to an exercise performance criteria, such as a pace, a duration, etc.

In at least one example embodiment, an operational parameter may be communicated by a user's ability to perceive deformation of the apparatus. For example, a user may perceive deformation of an apparatus by applying a force to the apparatus to determine the apparatus' susceptibility to deformation.

FIGS. 2A-2C are diagrams illustrating a conceptual metaphor for a deformation representation with respect to an operation parameter. The metaphor relates to deformability of a ball based on the amount of air in the ball. Many users have, at least some, experience with an inflatable object, such as a ball.

FIG. 2A illustrates a ball 200 in a fully inflated state. Many users associate a fully inflated object with the object being difficult to deform. For example, the air pressure of the object resists force by the user when the user is attempting to cause deformation. In at least one version of this metaphor, a user may associate the difficulty in causing deformation of the inflated object with the object being full.

FIG. 2B illustrates a ball 200 in a partially inflated state. Many users associate a partially inflated object with the object being easier to deform than a fully inflated object, but more difficult to deform than an uninflated object. For example, once the ball is deformed, the air pressure of the object resists force by the user when the user is attempting to cause further deformation. However, when applying an equal amount of force, the user may be able to cause further deformation of the partially inflated ball of FIG. 2B than the fully inflated ball of FIG. 2A. In at least one version of this metaphor, a user may associate this intermediate difficulty in causing deformation of the inflated object with the object being partially full.

FIG. 2C illustrates a ball 200 in an uninflated state. Many users associate an uninflated object with the object being easy to deform. For example, the lack of air pressure of the object causes less resistance to force applied by the user when the user is attempting to cause deformation. In at least one version of this metaphor, a user may associate the ease in causing deformation of the inflated object with the object being empty or nearly empty.

Figure 2D:
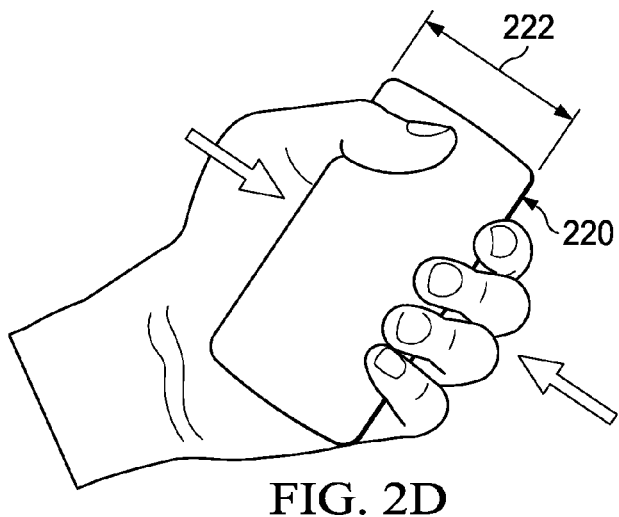
FIGS. 2D-2F are diagrams illustrating a representation of a compression deformation according to at least one example embodiment.
Figure 2E:
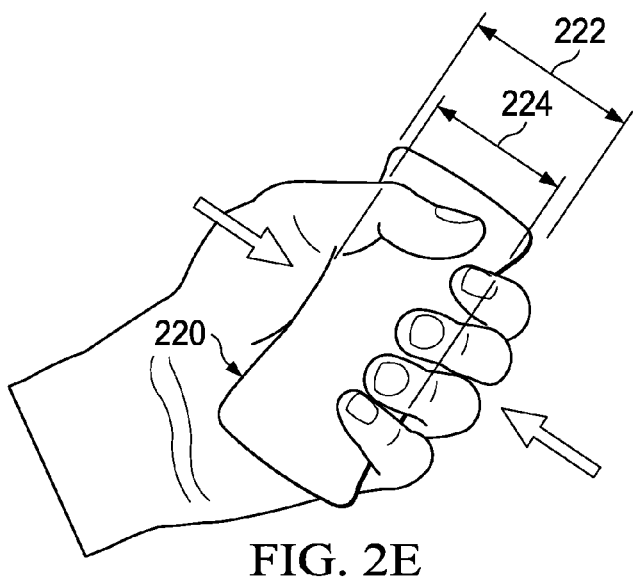
Figure 2F:
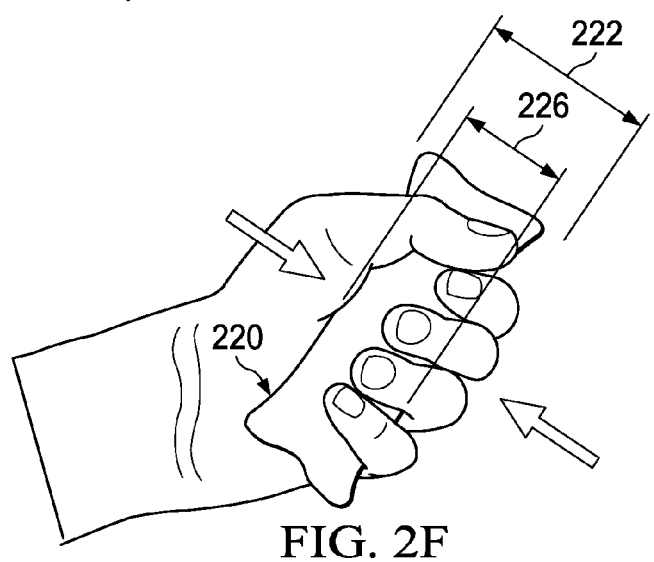
Figure 2G:
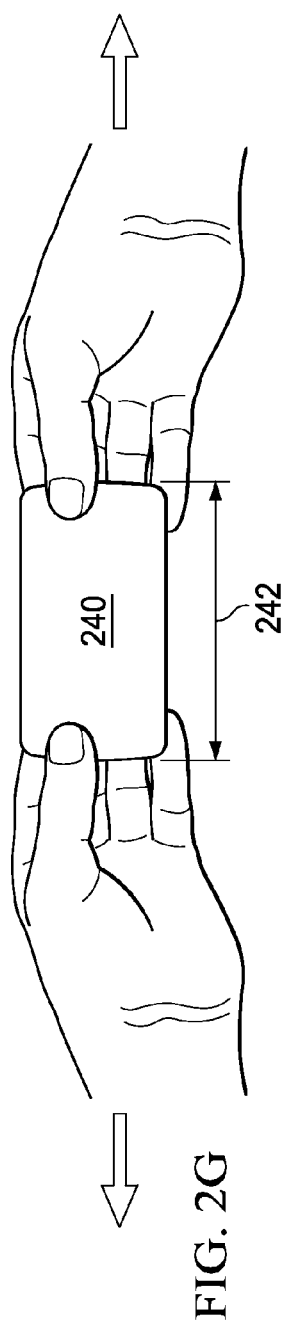
FIGS. 2G-2I are diagrams illustrating a representation of a tensile deformation according to at least one example embodiment.
Figure 2H:
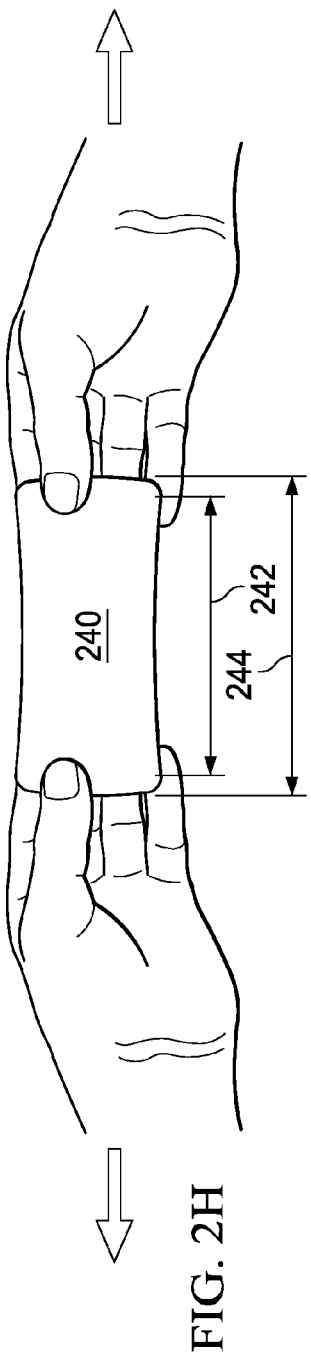
Figure 2I:
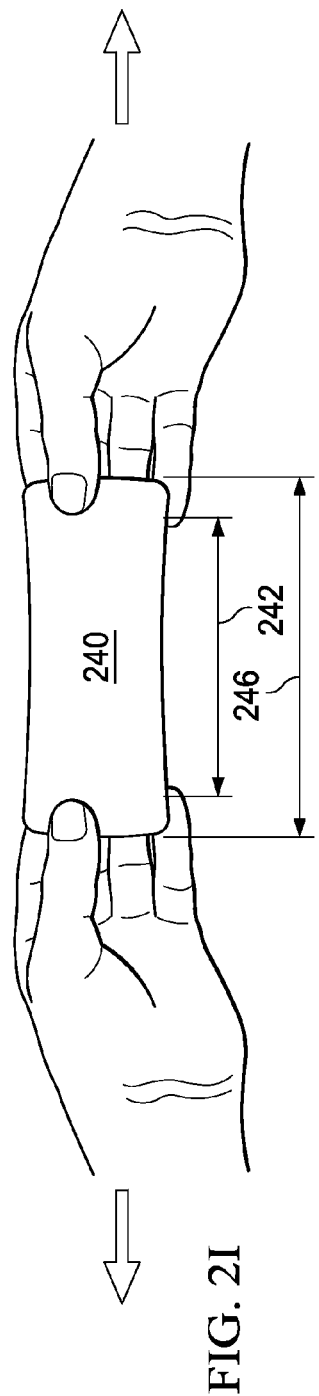
Figure 2J:
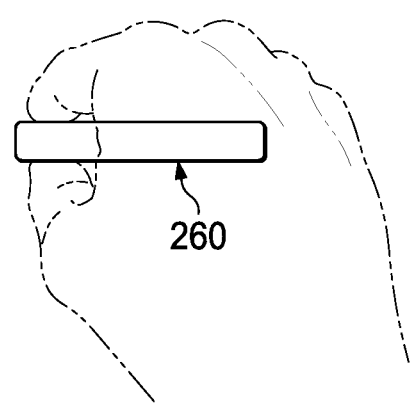
FIGS. 2J-2L are diagrams illustrating a representation of a torsion deformation according to at least one example embodiment.
Figure 2K:
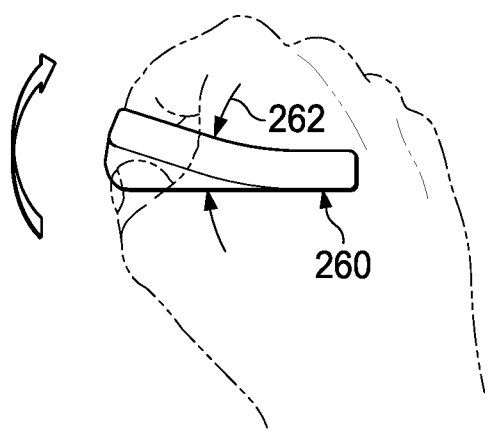
Figure 2L:
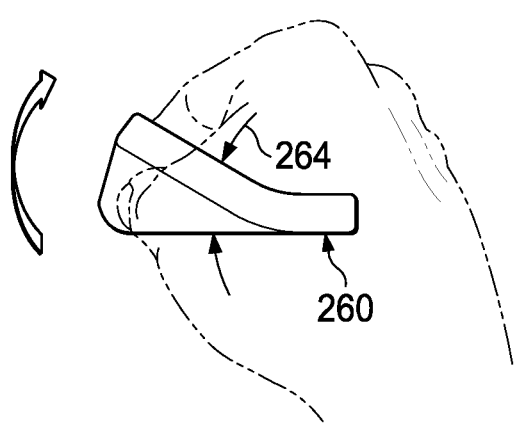
Figure 2M:
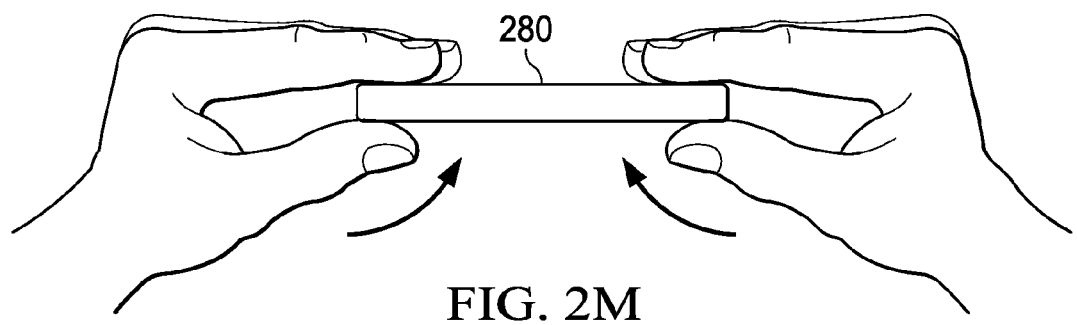
FIGS. 2M-2O are diagrams illustrating a representation of a flexural deformation according to at least one example embodiment.
Figure 2N:
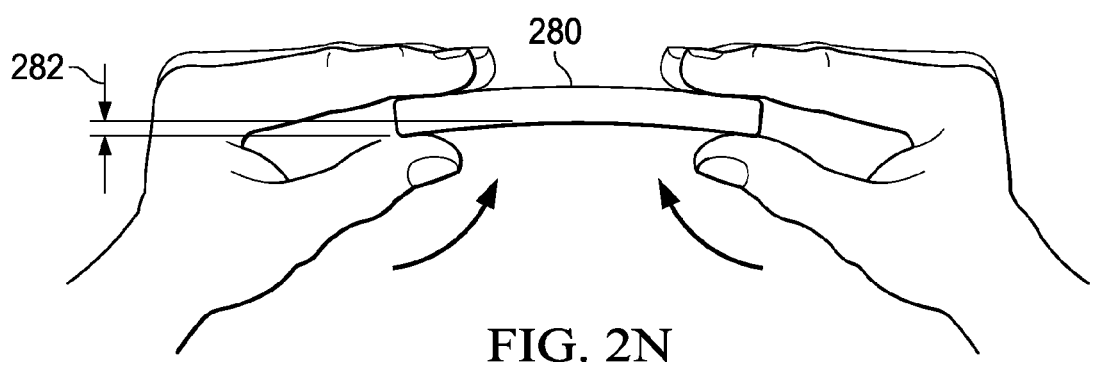
Figure 2O:
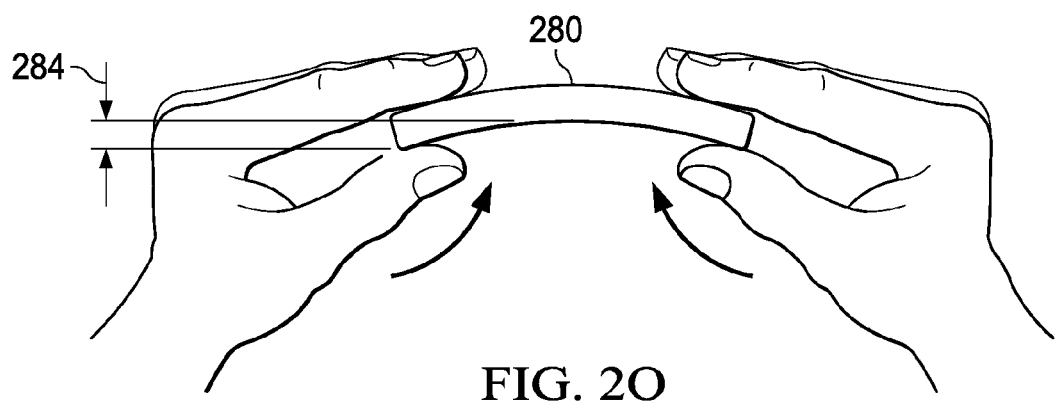
Figure 2P:
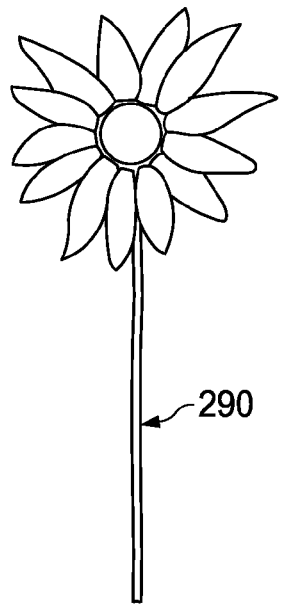
FIGS. 2P-2R are diagrams illustrating a conceptual metaphor for a deformation representation with respect to an operation parameter according to at least one example embodiment.
Figure 2Q:
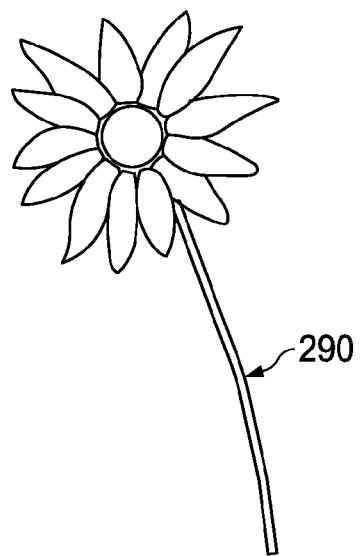
Figure 2R:
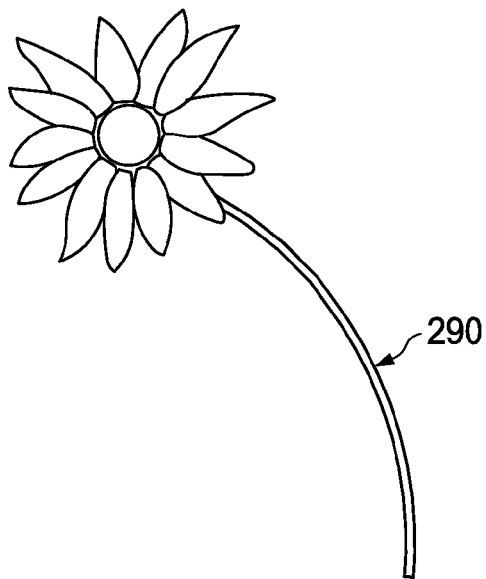

FIGS. 2P-2R are diagrams illustrating a conceptual metaphor for a deformation representation with respect to an operation parameter. The metaphor relates to rigidity of a flower stem based on the health of the flower. Many users have, at least some, experience with plants wilting when they have insufficient water and being more rigid when they have sufficient water.

FIG. 2P illustrates a flower 290 in a fully hydrated state. Many users may associate a fully hydrated plant with the plant being difficult to deform. For example, hydrated state of the plant resists force by the user when the user is attempting to cause deformation. In at least one version of this metaphor, a user may associate the difficulty in causing deformation of the hydrated plant with fullness.

FIG. 2Q illustrates a flower 290 in a partially hydrated state. Many users may associate a partially hydrated plant with the plant being easier to deform than a fully hydrated plant, but more difficult to deform than a poorly hydrated plant. For example, once the plant is deformed, the hydration of the plant resists force by the user when the user is attempting to cause further deformation. However, when applying an equal amount of force, the user may be able to cause further deformation of the partially hydrated plant of FIG. 2Q than the fully hydrated plant of FIG. 2A. In at least one version of this metaphor, a user may associate this intermediate difficulty in causing deformation of the partially hydrated plant with partial fullness.

FIG. 2R illustrates a flower 290 in an poorly hydrated state. Many users may associate a poorly hydrated plant with the plant being easy to deform. For example, the lack of hydration of the plant causes less resistance to force applied by the user when the user is attempting to cause deformation. In at least one version of this metaphor, a user may associate the ease in causing deformation of the poorly hydrated plant with emptiness or near emptiness.

Even though the ball metaphor of FIGS. 2A-2C and the flower metaphor of FIGS. 2P-2R relate high resistance to deformation with fullness and low resistance to deformation with emptiness, other metaphors may vary regarding such a relationship. For example, a pasta metaphor may relate deformation in an opposite manner to that of the ball metaphor. For example, the pasta metaphor may relate to high resistance to deformation with emptiness (ex. the pasta has not absorbed water), and a low resistance to deformation with fullness (ex. the pasta has absorbed water). It should be understood that many varying metaphors may be utilized in providing an allowing a user to have an recognize an intuitive relationship between felling a deformation and information being communicated by the apparatus.

In at least one example embodiment, an apparatus may communicate information regarding an operational parameter by way of deformation of the apparatus. For example, the apparatus may communicate a parameter along a scale of the apparatus providing a perception of high deformation resistance in to providing a perception of low deformation resistance.

In at least one example embodiment, an apparatus determines a deformation attribute based, at least in part, on at least one operational parameter. In at least one example embodiment, the deformation attribute relates to at least one aspect of a user's perception of a characteristic of deformation of the apparatus.

In at least one example embodiment, the deformation attribute may be associated with a deformation classification. For example, a deformation attribute may comprise information representing at least one deformation classification. A deformation classification may relate to a reaction of the deformation to an applied force. For example, a deformation classification may be a compression deformation classification. In at least one example embodiment, a compression deformation classification relates to a deformation that brings opposing sides of an apparatus towards each other, similar as described regarding FIGS. 2D-2F. In another example, a deformation classification may be a tensile deformation classification. In at least one example embodiment, a tensile deformation classification relates to a deformation that brings opposing sides of an apparatus away from each other, similar as described regarding FIGS. 2G-2I. In another example, a deformation classification may be a torsion deformation classification. In at least one example embodiment, a torsion deformation classification relates to a deformation that rotates opposing sides of an apparatus in opposite directions from each other, such as twisting, similar as described regarding FIGS. 2J-2L. In another example, a deformation classification may be a flexural deformation classification. In at least one example embodiment, a flexural deformation classification relates to a deformation that translates a part of the apparatus between opposing sides of the apparatus in relation to the opposing sides of the apparatus, such as bending, similar as described regarding FIGS. 2M-2O.

In at least one example embodiment, a deformation attribute is associated with at least one deformation direction. For example, a deformation attribute may comprise information representing at least one deformation direction. In at least one example embodiment, a deformation direction relates to a direction associated with the change in the apparatus associated with the deformation. For example, a deformation direction may relate to a deformation along an axis in relation to the apparatus. For example, a tensile deformation along the x axis of an apparatus is associated with a different deformation direction than a tensile deformation along the y axis of the apparatus. In another example, deformation direction may relate to a direction of deformation. For example, a torsion deformation may relate to a clockwise rotation of a side of the apparatus with respect to the other side of the apparatus. In at least one example embodiment, deformation direction relates to both axis and direction. For example, a flexural deformation may relate to flexion along an axis as well as which direction the flex is taking place. For example, a flex along the x axis of the apparatus may also be upward, downward, forward, rearward, and/or the like.

In at least one example embodiment, a deformation attribute comprises a deformation magnitude. The deformation magnitude may relate to an extent of deformation. For example, a deformation magnitude may relate to a resistive force associated with a deformation. In such an example, the ball of FIG. 2A may be associated with a high magnitude resistive force associated with any deformation, while the ball of FIG. 2B may be associated with an increasing magnitude of resistive force as application of the force nears the center of the ball, while the ball of FIG. 2C may be associated with a low magnitude of restive force associated with any deformation.

In at least one example embodiment, the deformation magnitude may be set to reflect a value of an operational parameter. For example, if an operation parameter is associated with a low value, such as a low battery charge, the deformation magnitude may be high to reflect the low value. Such an example implicates the ball metaphor of FIGS. 2A-2C or the flower metaphor of FIGS. 2P-2R by providing the user with a greater deformation associated with low value. In another example, if an operation parameter is associated with a moderate value, such as a moderate cellular signal strength (i.e. a cellular signal strength that is less than full strength and greater than minimum cellular strength), the deformation magnitude may be moderate to reflect the moderate value. Such an example implicates the ball metaphor of FIG. 2B by providing the user with a greater deformation than the deformation associated with high value but less deformation than the deformation associated with a low value. In yet another example, if an operation parameter is associated with a high value, such as a position in a song that is 90% through the duration of the song, the deformation magnitude may be low to reflect the high value. Such an example implicates the ball metaphor of FIG. 2A or the flower metaphor of FIG. 2P by providing the user with a less deformation associated with high value. Even though the previous example describes an inversely proportional relationship between an operational parameter value and a deformation magnitude, other examples may relate to a directly proportional relationship between the operational parameter value and the deformation magnitude. For example, it may be intuitive to a user for a distance to a navigation location to be represented as a directly proportional relationship between distance value and deformation magnitude. In such an example, the directly proportional relationship would provide for higher deformation magnitude at greater distances from the navigation location and provide for lower deformation magnitude at lesser distances from the navigation location. In such an example, the user may experience less deformation the closer the user is to the navigation location.

In at least one example embodiment, there may be a deformation representation by the apparatus that is indicative of the deformation attribute. In at least one example embodiment, the deformation representation relates to a physical actuation of the apparatus that induces a user perception of a deformation. For example, a deformation representation may relate to setting a structural property of the apparatus, similar as described regarding FIGS. 3A-3D. In another example, a deformation representation may relate to the apparatus providing a simulation of deformation to the user, similar as described regarding FIG. 4 and FIGS. 6A-6C. In still another example, a deformation representation may relate to a combination of setting a structural property and simulation. In such an example, the simulation may enhance the deformation representation of the structural property by allowing for user perception of deformation beyond that of the structural property.

The deformation representation may be indicative of the deformation attribute by way of representing at least one of the deformation classification, the deformation direction, the deformation magnitude, and/or the like that may be associated with the deformation attribute. Therefore, the deformation representation may be associated with a deformation classification, a deformation direction, a deformation magnitude, and/or the like. For example, the deformation representation may have a deformation classification that corresponds to the deformation attribute's deformation classification, if any. In another example, the deformation representation may have a deformation direction that corresponds to the deformation attribute's deformation direction, if any. In yet another example, the deformation representation may have a deformation magnitude that corresponds to the deformation attribute's deformation magnitude, if any.

In at least one example embodiment, the apparatus may cause deformation representation absent any visual indication of the operational parameter. For example, the deformation representation may fail to correlate to any information presented on a display, such as a menu item, a displayed operational parameter, and/or the like. At least one possible technical advantage associated with such lack of visual correlation to the deformation representation is to provide an independent representation of the operational parameter to the user so that the user is not unnecessarily distracted by a desire to view a visual correlation. For example, if the user is driving a vehicle, it may be desirable to provide the deformation representation absent any visual correlation to the deformation representation.

FIGS. 2D-2F are diagrams illustrating a representation of a compression deformation according to at least one example embodiment. The examples of FIGS. 2D-2F are merely examples of a compression deformation, and do not limit the scope of the claims. For example, direction of the compression may vary, magnitude of the compression may vary, and/or the like. In addition, even though the examples of FIGS. 2D-2F illustrate hands applying force to the apparatus, other applications of force may be utilized, such as acceleration. For example, a compression deformation may relate to an acceleration force.

FIGS. 2D-2F illustrate a deformation representation of apparatus 220 as perceived by a user. The deformation representation of FIGS. 2D-2F may relate to a physical deformation, similar as described regarding FIGS. 3A-3D, a simulation of a deformation, similar as described regarding FIG. 4 and/or FIGS. 6A-6C, and/or the like.

The representation of deformation of FIGS. 2D-2F corresponds to a compression deformation classification. It can be seen in FIGS. 2D-2F that force is being applied to opposing sides of apparatus 220. FIG. 2D illustrates a circumstance where there is a representation of no deformation. The representation of no deformation relates to a representation that causes the user to perceive a lack of deformation from the force being applied. For example, distance 222 may remain substantially the same before application of force and after application of force. In at least one example embodiment, a distance being substantially the same relates to a distance that has not changed to the extent that can be perceived by a user.

FIG. 2E illustrates a circumstance where there is a representation of deformation. The representation of deformation represents a change in the distance between, at least part of, opposing sides of apparatus 220. The represented change of FIG. 2E is a representation of change in distance from distance 222 to distance 224. In at least one example embodiment, the same amount of force as applied in the example of FIG. 2D may be applied in the example of FIG. 2E. The representation of deformation based on the same force is indicative of a deformation attribute, such as a deformation magnitude. In this manner, a user may perceive information regarding an operational parameter by way of the indication of the deformation attribute associated with the operation parameter.

FIG. 2F illustrates a circumstance where there is a representation of deformation. The representation of deformation represents a change in the distance between, at least part of, opposing sides of apparatus 220. The represented change of FIG. 2F is a representation of change in distance from distance 222 to distance 224. In at least one example embodiment, the same amount of force as applied in the example of FIG. 2E may be applied in the example of FIG. 2F. The representation of deformation based on the same force is indicative of a deformation attribute, such as a deformation magnitude. In this manner, the representation of deformation may be indicative of a resistive force. For example, the deformation magnitude can relate to a resistive force of the deformation representation. In this manner, a user may perceive information regarding an operational parameter by way of the indication of the deformation attribute associated with the operation parameter.

Even though the deformation direction indicated by the deformation representation of FIGS. 2D-2F is shown to be across the width of apparatus 220, the deformation direction may be across the height of apparatus 220, across the depth of apparatus 220, and/or the like.

FIGS. 2G-2I are diagrams illustrating a representation of a tensile deformation according to at least one example embodiment. The examples of FIGS. 2G-2I are merely examples of tensile deformation, and do not limit the scope of the claims. For example, direction of the tensile deformation may vary, magnitude of the tensile deformation may vary, and/or the like. In addition, even though the examples of FIGS. 2G-2I illustrate hands applying force to the apparatus, other applications of force may be utilized, such as acceleration. For example, a tensile deformation may relate to an acceleration force.

FIGS. 2G-2I illustrate a deformation representation of apparatus 240 as perceived by a user. The deformation representation of FIGS. 2G-2I may relate to a physical deformation, similar as described regarding FIGS. 3A-3D, a simulation of a deformation, similar as described regarding FIG. 4 and/or FIGS. 6A-6C, and/or the like.

The representation of deformation of FIGS. 2G-2I corresponds to a tensile deformation classification. It can be seen in FIGS. 2G-2I that force is being applied to opposing sides of apparatus 240. FIG. 2G illustrates a circumstance where there is a representation of no deformation. The representation of no deformation relates to a representation that causes the user to perceive a lack of deformation from the force being applied. For example, distance 242 may remain substantially the same before application of force and after application of force. In at least one example embodiment, a distance being substantially the same relates to a distance that has not changed to the extent that can be perceived by a user.

FIG. 2H illustrates a circumstance where there is a representation of deformation. The representation of deformation represents a change in the distance between, at least part of, opposing sides of apparatus 240. The represented change of FIG. 2H is a representation of change in distance from distance 242 to distance 244. In at least one example embodiment, the same amount of force as applied in the example of FIG. 2G may be applied in the example of FIG. 2H. The representation of deformation based on the same force is indicative of a deformation attribute, such as a deformation magnitude. In this manner, a user may perceive information regarding an operational parameter by way of the indication of the deformation attribute associated with the operation parameter.

FIG. 2I illustrates a circumstance where there is a representation of deformation. The representation of deformation represents a change in the distance between, at least part of, opposing sides of apparatus 240. The represented change of FIG. 2I is a representation of change in distance from distance 242 to distance 244. In at least one example embodiment, the same amount of force as applied in the example of FIG. 2H may be applied in the example of FIG. 2I. The representation of deformation based on the same force is indicative of a deformation attribute, such as a deformation magnitude. In this manner, the representation of deformation may be indicative of a resistive force. For example, the deformation magnitude can relate to a resistive force of the deformation representation. In this manner, a user may perceive information regarding an operational parameter by way of the indication of the deformation attribute associated with the operation parameter.

Even though the deformation direction indicated by the deformation representation of FIGS. 2G-2I is shown to be across the height of apparatus 240, the deformation direction may be across the width of apparatus 240, across the depth of apparatus 240, and/or the like.

FIGS. 2J-2L are diagrams illustrating a representation of a torsion deformation according to at least one example embodiment. The examples of FIGS. 2J-2L are merely examples of torsion deformation, and do not limit the scope of the claims. For example, magnitude of the torsion deformation may vary, direction of the torsion deformation may vary, and/or the like. In addition, even though the examples of FIGS. 2J-2L illustrate hands applying force to the apparatus, other applications of force may be utilized, such as acceleration. For example, a torsion deformation may relate to an acceleration force, such as a rotational acceleration force.

FIGS. 2J-2L illustrate a deformation representation of apparatus 260 as perceived by a user. The deformation representation of FIGS. 2J-2L may relate to a physical deformation, similar as described regarding FIGS. 3A-3D, a simulation of a deformation, similar as described regarding FIG. 4 and/or FIGS. 6A-6C, and/or the like.

The representation of deformation of FIGS. 2J-2L corresponds to a torsion deformation classification. It can be seen in FIGS. 2J-2L that opposing rotational force is being applied to opposing sides of apparatus 260. FIG. 2J illustrates a circumstance where there is a representation of no deformation. The representation of no deformation relates to a representation that causes the user to perceive a lack of deformation from the force being applied. For example, the angle between opposing sides of apparatus 260 may remain substantially the same before application of force and after application of force. In at least one example embodiment, an angle being substantially the same relates to an angle that has not changed to the extent that can be perceived by a user.

FIG. 2K illustrates a circumstance where there is a representation of deformation. The representation of deformation represents a change in the angle between, at least part of, opposing sides of apparatus 260. The represented change of FIG. 2K is a representation of change in angle from substantially the same angle to angle 262. In at least one example embodiment, the same amount of force as applied in the example of FIG. 2J may be applied in the example of FIG. 2K. The representation of deformation based on the same force is indicative of a deformation attribute, such as a deformation magnitude. In this manner, a user may perceive information regarding an operational parameter by way of the indication of the deformation attribute associated with the operation parameter.

FIG. 2L illustrates a circumstance where there is a representation of deformation. The representation of deformation represents a change in the angle between, at least part of, opposing sides of apparatus 260. The represented change of FIG. 2L is a representation of change in angle from substantially the same angle to angle 262. In at least one example embodiment, the same amount of force as applied in the example of FIG. 2K may be applied in the example of FIG. 2L. The representation of deformation based on the same force is indicative of a deformation attribute, such as a deformation magnitude. In this manner, the representation of deformation may be indicative of a resistive force. For example, the deformation magnitude can relate to a resistive force of the deformation representation. In this manner, a user may perceive information regarding an operational parameter by way of the indication of the deformation attribute associated with the operation parameter.

Even though the deformation direction indicated by the deformation representation of FIGS. 2J-2L is shown to be around a height axis of apparatus 260, the deformation direction may be around a width axis of apparatus 260, around a depth axis of apparatus 260, and/or the like.

FIGS. 2M-2O are diagrams illustrating a representation of a flexural deformation according to at least one example embodiment. The examples of FIGS. 2M-2O are merely examples of flexural deformation, and do not limit the scope of the claims. For example, direction of the flexural deformation may vary, magnitude of the flexural deformation may vary, and/or the like. In addition, even though the examples of FIGS. 2M-2O illustrate hands applying force to the apparatus, other applications of force may be utilized, such as acceleration. For example, a flexural deformation may relate to an acceleration force.

FIGS. 2M-2O illustrate a deformation representation of apparatus 280 as perceived by a user. The deformation representation of FIGS. 2M-2O may relate to a physical deformation, similar as described regarding FIGS. 3A-3D, a simulation of a deformation, similar as described regarding FIG. 4 and/or FIGS. 6A-6C, and/or the like.

The representation of deformation of FIGS. 2M-2O corresponds to a flexural deformation classification. It can be seen in FIGS. 2M-2O that a flexural force is being applied to opposing sides of apparatus 280. FIG. 2M illustrates a circumstance where there is a representation of no deformation. The representation of no deformation relates to a representation that causes the user to perceive a lack of deformation from the force being applied. For example, translation of a part of apparatus 280 may remain substantially the same before application of force and after application of force. In at least one example embodiment, a distance being substantially the same relates to a distance that has not changed to the extent that can be perceived by a user.

FIG. 2N illustrates a circumstance where there is a representation of deformation. The representation of deformation represents a translation distance of a part of the apparatus due to a representation of flexing of apparatus 280. The represented change of FIG. 2N is a representation of change in distance from translation of the part of the apparatus to distance 282. In at least one example embodiment, the same amount of force as applied in the example of FIG. 2M may be applied in the example of FIG. 2N. The representation of deformation based on the same force is indicative of a deformation attribute, such as a deformation magnitude. In this manner, a user may perceive information regarding an operational parameter by way of the indication of the deformation attribute associated with the operation parameter.

FIG. 2O illustrates a circumstance where there is a representation of deformation. The representation of deformation represents a translation distance of a part of the apparatus due to a representation of flexing of apparatus 280. The represented change of FIG. 2N is a representation of change in distance from translation of the part of the apparatus to distance 284. In at least one example embodiment, the same amount of force as applied in the example of FIG. 2N may be applied in the example of FIG. 2O. The representation of deformation based on the same force is indicative of a deformation attribute, such as a deformation magnitude. In this manner, the representation of deformation may be indicative of a resistive force. For example, the deformation magnitude can relate to a resistive force of the deformation representation. In this manner, a user may perceive information regarding an operational parameter by way of the indication of the deformation attribute associated with the operation parameter.

Even though the deformation direction indicated by the deformation representation of FIGS. 2M-2O is shown to be across the depth of apparatus 280, the deformation direction may be across the width of apparatus 280, across the height of apparatus 280, and/or the like.

FIGS. 3A-3D are diagrams illustrating devices associated with controlling a structural property of an apparatus according to at least one example embodiment. The examples of FIGS. 3A-3D are merely examples of devices associated with controlling a structural property of an apparatus, and do not limit the scope of the claims. For example, direction associated with the structural property may vary, means for achieving control of the structural property may vary, and/or the like.

In at least one example embodiment, causing a deformation representation comprises setting of a structural property of the apparatus. Setting of a structural property of the apparatus may relate to providing a directive to a device that is configured to vary one or more structural properties of the apparatus. Such directive may comprise information directing the device to exhibit a particular structural property, such as a particular resistive force. In at least one example embodiment, a structural property relates to a mechanical characteristic of the apparatus that is related to deformation of the apparatus. For example, a structural property may relate to the apparatus' resistance to compression, resistance to tensile expansion, resistance to torsion, resistance to flexing, and/or the like.

The device may be configured such that the device controls a particular aspect of a deformation attribute. For example, the device may be configured to control a particular deformation direction, a particular deformation classification, a particular range of deformation magnitude, and/or the like.

In at least one example embodiment, the apparatus may consume power while exhibiting control over the structural property. Under such circumstances, it may be beneficial for the apparatus to reduce the amount of time that the structural property is being controlled. For example the apparatus may monitor one or more force sensors to determine that a user may be sampling the deformation of the apparatus. In such circumstances, the apparatus may cause the setting of the structural property in relation to this force input. For example, the apparatus may avoid power consumption associated with control of the structural property by avoiding power consuming settings of structural properties during times where there is no force sensor indication that the user is sampling the deformation of the apparatus. In other words, the apparatus may base setting of the structural property on indication of a force input that corresponds with the deformation attribute associated with the structural property.

In at least one example embodiment, a motor device may be used in conjunction with a segmented apparatus to control a structural property of the apparatus. For example, a motor can be used to adjust resistive force between segments such that the represented structural property of the motor controlled segments is associated with compressive deformation, tensile deformation, torsion deformation, flexural deformation, and/or the like.

Figure 3A:
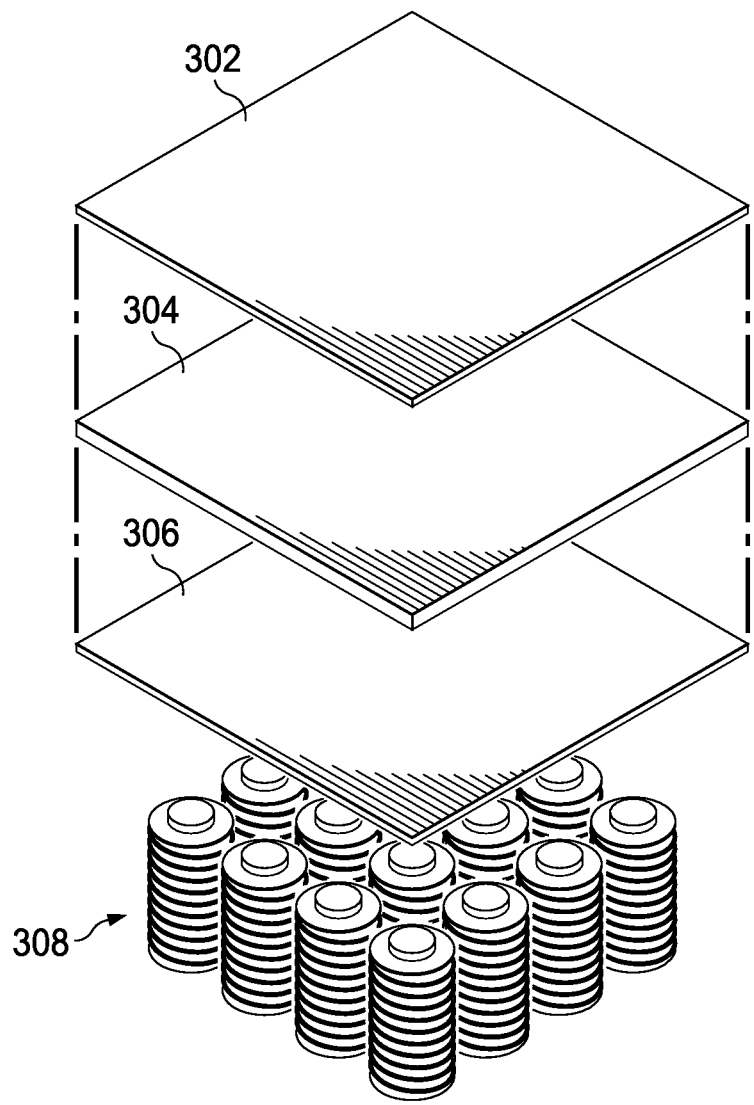
FIGS. 3A-3D are diagrams illustrating devices associated with controlling a structural property of an apparatus according to at least one example embodiment.

FIG. 3A is an example of a device configured to control a compressive physical property. The device of FIG. 3A comprises a touch and protection layer 302. Layer 302 may provide protection to magnetorheological fluid container 304. If touch sensing is desirable, the device may provide sensor layer 306. In at least one example embodiment, sensor layer 306 may comprise a force sensor. The device of FIG. 3A comprises an electromagnetic array 308.

The magnetorheological fluid relates to a fluid with a viscosity that can be varied by a magnetic field. The magnetorheological fluid may comprise a carrier fluid, such as glycerin, and free flowing ferromagnetic particles, such as carbonyl iron particles. The device may control compressive resistance of layer 304 by varying the magnetic field of, at least part of, the electromagnetic array 308.

Figure 3B:
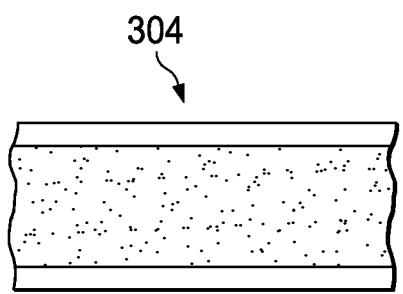
Figure 3C:
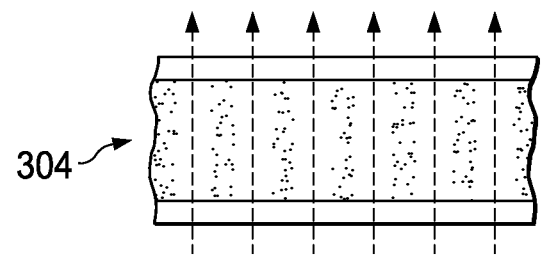

As depicted in FIG. 3B, the ferromagnetic particles of layer 304 are randomly distributed in the absence of a magnetic field. This random distribution results in low viscosity, which corresponds to a low resistive deformation force. As depicted in FIG. 3C, as the magnetic field increases, the ferromagnetic particles become more aligned along the flux lines of the magnetic field. Alignment of the ferromagnetic particles results in increase in viscosity, which corresponds to an increase in resistive deformation force. As the ferromagnetic particles become more aligned, the viscosity further increases.

Figure 3D:
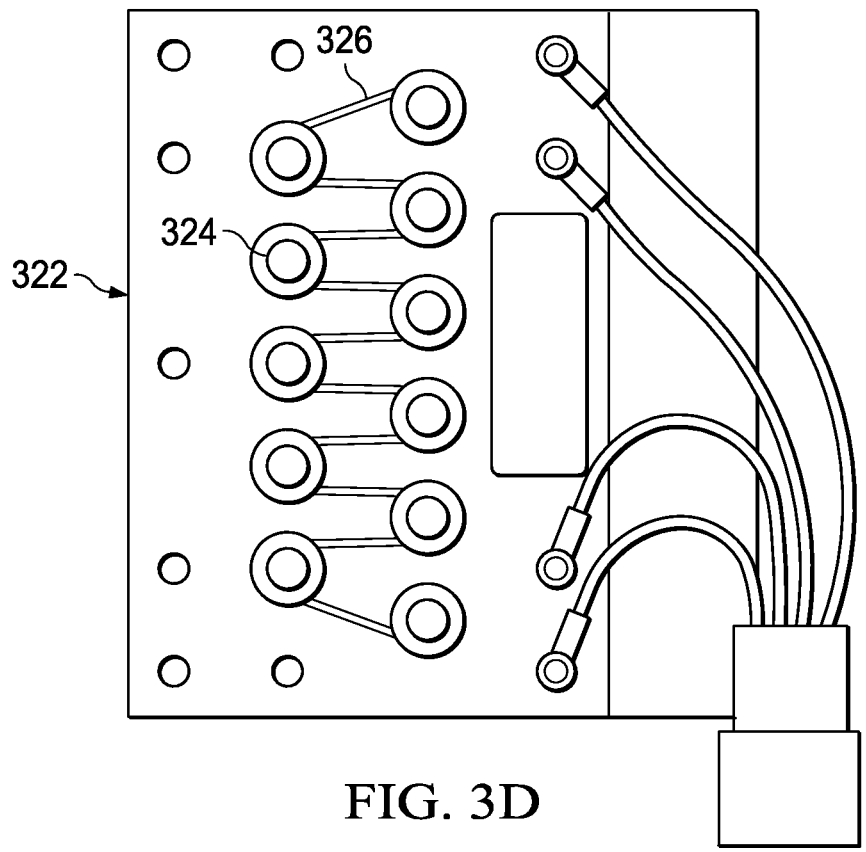

FIG. 3D is an example of a device configured to control a tensile physical property, a flexural physical property, and/or the like. The device of FIG. 3D comprises pulleys 324 mounted to apparatus 322, and a shape-memory allow (SMA) wire wound between the pulleys. The SMA wire may comprise any shape-memory alloy, such as Bio Metal Fiber 150. The SMA provides control as well as force sensing. For example, the electrical properties associated with the SMA wire vary as force exerted on the SMA wire varies. In addition, the SMA wire may be heated, for example by electrical current, to vary the tension of the wire between the pulleys. As the tension between the pulleys increases, the resistive force of the apparatus in opposition to this tension increases. Therefore, this tension may be used to provide a resistive force associated with flexion towards the pulleys. In addition, this tension may be used to provide a resistive force associated with tensile expansion between the pulleys.

Figure 4:
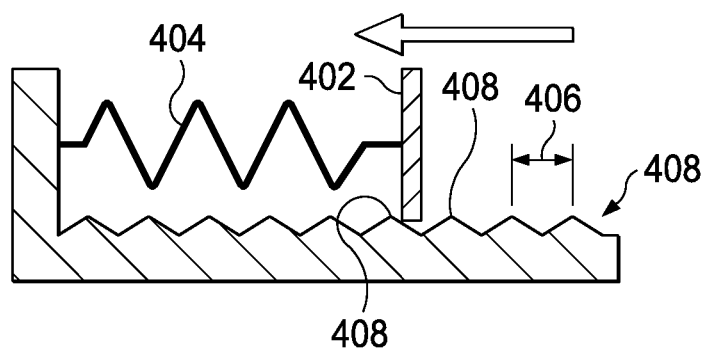
FIG. 4 is a diagram illustrating a model associated with simulation of a deformation according to at least one example embodiment.

FIG. 4 is a diagram illustrating a model associated with simulation of a deformation according to at least one example embodiment. The example of FIG. 4 is merely an example of a model associated with simulation of a deformation, and does not limit the scope of the claims. For example, haptic indication of deformation may vary, relationships among simulation aspects may vary, and/or the like.

In at least one example embodiment, it may be cost prohibitive for an apparatus to include a device for controlling a structural property. Under such circumstances, it may be desirable to provide a simulation of deformation instead of, or in addition to, setting a structural property of the apparatus.

In at least one example embodiment, an apparatus may incorporate mechanisms for controlling a structural property that allow for lower magnitude of deformation representation than desired. In such circumstances, it may be desirable to supplement the deformation representation for eh structural property with simulation of deformation. In this manner, the deformation representation may comprise simulation of deformation in conjunction with control of a structural property.

In at least one example embodiment, deformation of an apparatus may be simulated by utilization of haptic signals, such as grains of vibration. For example, the haptic signals may provide a user with an illusion of movement of the surface of an apparatus, vibrations associated with a structural shifting of the apparatus, and/or the like. In at least one example embodiment, the haptic signals may be dependent upon force input from the user. For example, the apparatus may determine timing, duration, intensity, and/or the like, of a haptic signal based, at least in part, on force sensor information, such as force sensor information associated with force input form the user. In this manner, the haptic signal can serve to simulate structural responsiveness to force being applied on the apparatus by the user.

FIG. 4 illustrates a model that may be used to provide simulation of deformation of the apparatus. The simulation of FIG. 4 relates to a simulated surface 402 that moves in response to applied force. In at least one example embodiment, the applied force of the model relates to force sensor information received in association with the user sampling deformation of the apparatus. The model includes a representation of a resistive force 404. The resistive force 404 may be modeled to simulate a force that varies over simulated distance, such as a simulated spring, remains constant over simulated distance, and/or the like. As force being applied to simulated surface 402 relates to causing simulated movement of the surface, haptic grain trigger points 402 may be encountered. The haptic grain trigger points may be distributed along a simulated movement range at an interval 406. The apparatus may cause rendering of a haptic grain based on the simulated model indicating movement of simulated surface 402 across a haptic grain trigger point 408. Such simulation provides a represented deformation to the user in that each grain may be perceived by the user as overcoming a point of friction in response to applied force. In at least one example embodiment, a haptic grain relates to an impulse haptic signal such as a click.

In at least one example embodiment, as the force is perceived by apparatus, for example by way of a force sensor, a gyroscope, an accelerometer, etc., the apparatus receives force sensor information, and simulates surface movement across haptic grain trigger points based on the relationship between simulated resistive forces 404 and the force indicated by the force sensor information.

Even though the example model of FIG. 4 is shown in relation to a compression deformation classification and/or a tensile deformation classification, a similar model may be applied to translation associated with a flexural deformation classification. For example, the haptic grain trigger points may relate to a change in flexural angle instead of, or in addition to, distance. In addition, a similar model may be applied to the angle change associated with a torsion deformation classification. In at least one example embodiment, a simulated deformation may provide a deformation indicative of a deformation magnitude by way of the number of haptic grains triggered by the simulation in response to applied force. For example, in response to a force, the simulation may cause rendering of 1 haptic grain in relation to a deformation magnitude indicative of a specific resistive force, and cause rendering of 3 haptic grains in relation to a deformation magnitude indicative of a lesser resistive force.

FIGS. 5A-5G are diagrams illustrating circumstances associated with an acceleration input according to at least one example embodiment. The examples of FIGS. 5A-5G are merely examples of circumstances associated with an acceleration input, and do not limit the scope of the claims. For example, direction of the orientation of the apparatus may vary, direction of acceleration may vary, linearity of the acceleration may vary, and/or the like.

As a user interacts with an apparatus, the user may perceive deformation of the apparatus independently of the amount of pressure that the user is exerting on the surface of the apparatus. For example, in at least one example embodiment, an apparatus may comprise a force sensor, and a deformation representation may be based, at least in part, on force sensor information that indicates an amount of pressure exerted by the user on the surface of the apparatus. However, there may be other ways that a user may be able to perceive a deformation representation. For example, people have become very adept at being able to perceive physical properties of an object based on the way the object deforms when placed under acceleration. For example, regardless of the amount of pressure exerted by a user, the user may be able to distinguish a rigid stick from a flexible stick by the way the stick feels when the user shakes it. For example, the user may feel flexural deformation of the stick resulting from the acceleration. In addition, as the acceleration is removed, or changes, the user may feel a restorative reaction in the stick when the stick flexes back to its original form. In this manner, a user may be able to test a deformation property of an object without necessarily changing the amount of force the user applies to the object by way of subjecting the object to acceleration while the user is touch the object.

In at least one example embodiment, an apparatus provides a deformation representation that is based, at least in part, on acceleration information. In at least one example embodiment, acceleration information may be received by way of an acceleration input. In at least one example embodiment, an acceleration input relates to a signal that communicates acceleration information. For example, an acceleration input may relate to acceleration from motion of the apparatus, acceleration from gravity, and/or the like. An acceleration input may be based on information received from an accelerometer, a gyroscope, and/or the like.

In at least one example embodiment, an apparatus may base a deformation representation on an acceleration input independently from pressure exerted on the surface apparatus by way of user contact with the apparatus. For example, the apparatus may lack a sensor, such as a force sensor, for determining pressure exerted by the user on the surface of the apparatus, the apparatus may omit utilization of a force sensor in determining a deformation representation associated with an acceleration input, and/or the like. For example, an apparatus may determine a compression deformation representation based on the pressure exerted by the user on the surface of the apparatus, and determine a tensile deformation representation based on an acceleration input that indicates that the apparatus is being shaken.

In at least one example embodiment, an acceleration input may correspond to a deformation attribute, and a different acceleration input may fail to correspond to a deformation attribute. An acceleration input may correspond to a deformation attribute if the acceleration input has a direction, a magnitude, and/or the like, associated with causation of deformation with regards to the deformation attribute. For example, acceleration directed horizontally across an apparatus may correspond to a deformation attribute relating to compression deformation, tensile deformation, flexural deformation, and/or the like, but fail to correspond to a torsion deformation.

In at least one example embodiment, an apparatus may preclude a deformation representation based on an acceleration input that fails to correspond with a deformation attribute. For example, the apparatus may determine whether an acceleration input corresponds to a deformation attribute. If the acceleration input corresponds to one or more deformation attributes, the apparatus may cause a deformation representation based, at least in part, on the acceleration input. However, if the acceleration input fails to correspond to one or more deformation attributes, the apparatus may preclude any deformation representation. Without limiting the scope of the claims in any way, at least some technical advantages associated with such preclusion may be to save power associated with causing a deformation representation, to avoid user confusion in circumstances where the acceleration input is inapplicable to a deformation representation that the user may be able to identify, etc.

Figure 5A:
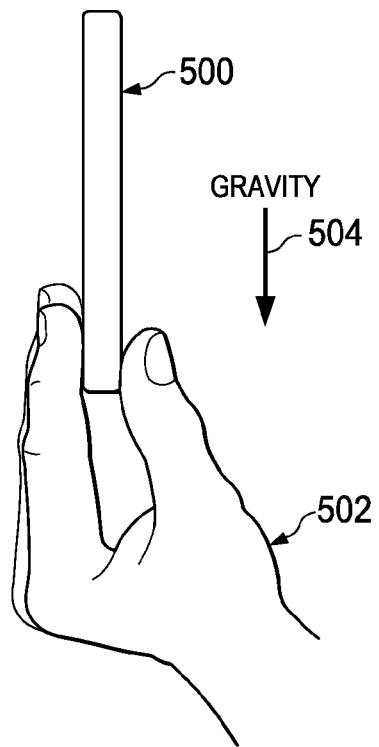
FIGS. 5A-5G are diagrams illustrating circumstances associated with an acceleration input according to at least one example embodiment.
Figure 5B:
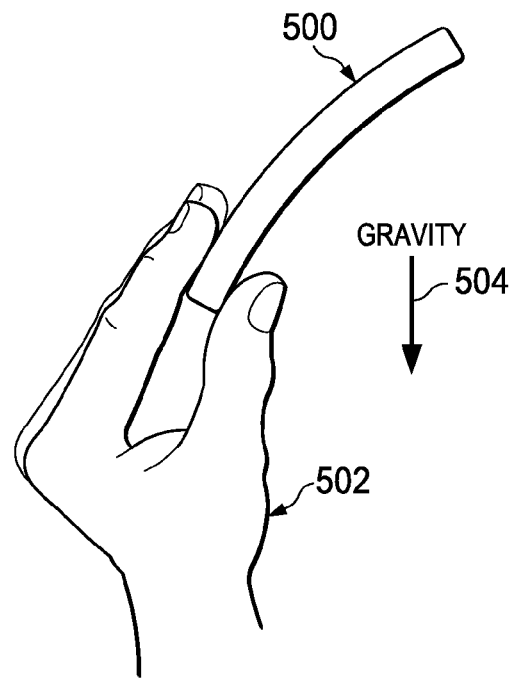
Figure 5C:
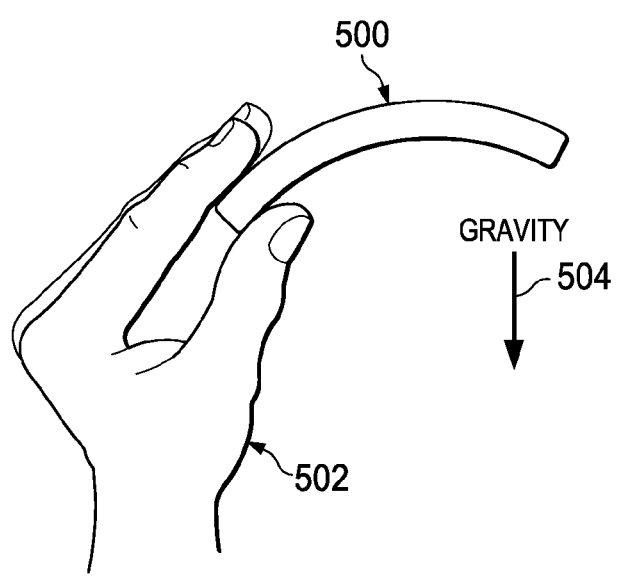

FIGS. 5A-5C are diagrams illustrating circumstances associated with an gravitational input according to at least one example embodiment. The examples of FIGS. 5A-5C illustrate an apparatus 500 held by a hand 502 in various orientations relative to a gravitational force 504. In the examples of FIGS. 5A-5C, curvature of apparatus 500 depicts a deformation representation. Even though some embodiments may control physical characteristics of the apparatus, other embodiments may utilize a simulated deformation. Therefore, the deformation of apparatus 500 relates to any deformation representation. Even though the examples of FIGS. 5A-5C illustrate a vertical orientation of apparatus 500, any orientation may be relevant.

FIG. 5A illustrates apparatus 500 being held in a vertical orientation with respect to gravity 504. In such an example, apparatus 500 may receive an acceleration input in a direction from the top of the apparatus to the bottom of the apparatus. The apparatus may cause a compression deformation representation with respect to the vertical axis of the apparatus based, at least in part, on the acceleration input.

FIG. 5B illustrates apparatus 500 being held in a tilted orientation with respect to gravity 504. In such an example, apparatus 500 may receive an acceleration input in a direction offset from the top of the apparatus to the bottom of the apparatus. The apparatus may cause a compression deformation representation with respect to the vertical axis of the apparatus based, at least in part, on the acceleration input, a flexural deformation representation based, at least in part, on the acceleration input, and/or the like. The example of FIG. 5B illustrates a flexural deformation representation in relation to the acceleration input associated with gravity.

FIG. 5C illustrates apparatus 500 being held in a tilted orientation, which is tilted further than the example of FIG. 5B, with respect to gravity 504. In such an example, apparatus 500 may receive an acceleration input in a direction further offset from the top of the apparatus to the bottom of the apparatus. The apparatus may cause a compression deformation representation with respect to the vertical axis of the apparatus based, at least in part, on the acceleration input, a flexural deformation representation based, at least in part, on the acceleration input, and/or the like. The example of FIG. 5C illustrates a flexural deformation representation in relation to the acceleration input associated with gravity. Since the tilt angle brings the vertical axis to a greater angle in relation to the direction of gravity, the flexural deformation representation of FIG. 5C may have a greater magnitude than that of FIG. 5B.

FIGS. 5D-5G are diagrams illustrating circumstances associated with an acceleration input relating to motion according to at least one example embodiment. The examples of FIGS. 5D-5G illustrate an apparatus 500 held by a hand 502 in various positions relative to a motion that a user is performing with apparatus 500. In the examples of FIGS. 5D-5G, curvature of apparatus 500 depicts a deformation representation. Even though some embodiments may control physical characteristics of the apparatus, other embodiments may utilize a simulated deformation. Therefore, the deformation of apparatus 500 relates to any deformation representation. Even though the examples of FIGS. 5D-5G illustrate waving motion, any motion may be relevant, such as a vertical motion, a twisting motion, and/or the like.

Figure 5D:
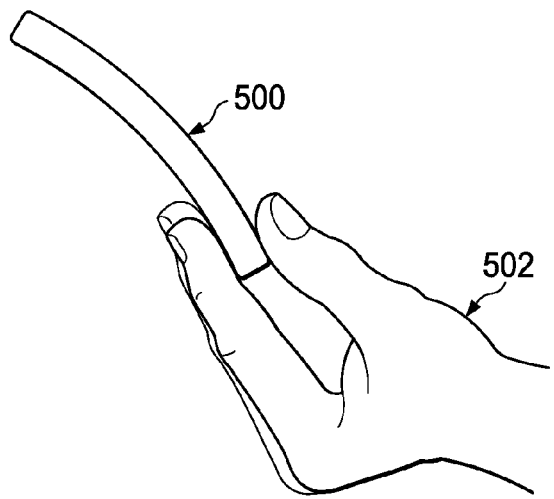

FIG. 5D illustrates apparatus 500 being accelerated into motion, such that there is acceleration associated with a horizontal axis of apparatus 500. In such an example, apparatus 500 may receive an acceleration input associated with the acceleration that the user is performing on apparatus 500. The apparatus may cause a flexural deformation representation based, at least in part, on the acceleration input. The example of FIG. 5D illustrates a flexural deformation representation in relation to the acceleration input associated with motion.

Figure 5E:
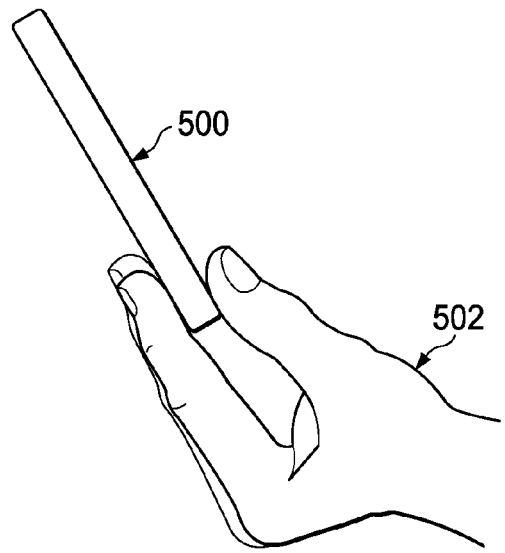

FIG. 5E illustrates apparatus 500 in motion or prior to motion, such that there is no acceleration associated with a horizontal axis of apparatus 500. In such an example, apparatus 500 may receive no acceleration input associated with motion the user is performing on apparatus 500, in the absence of acceleration. The apparatus may preclude a flexural deformation representation based, at least in part, on the lack of acceleration input.

Figure 5F:
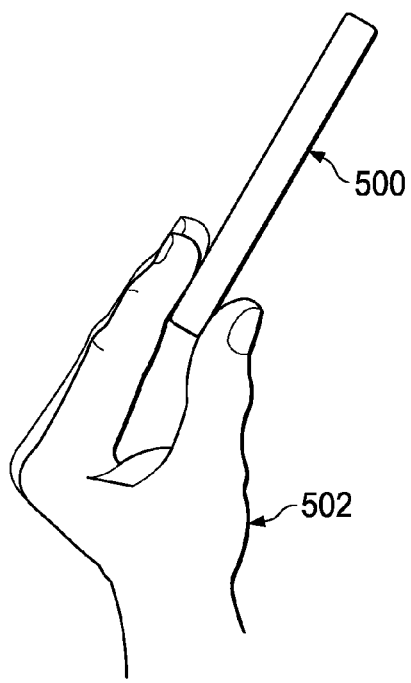

FIG. 5F illustrates apparatus 500 in motion or after termination of motion, such that there is no acceleration associated with a horizontal axis of apparatus 500. In such an example, apparatus 500 may receive no acceleration input associated with motion the user is performing on apparatus 500, in the absence of acceleration. The apparatus may preclude a flexural deformation representation based, at least in part, on the lack of acceleration input.

Figure 5G:
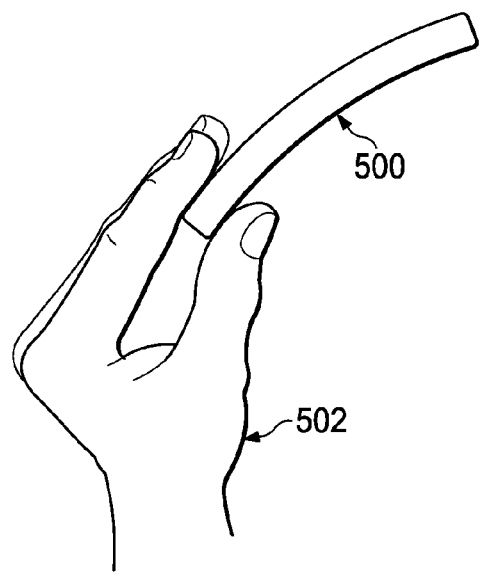

FIG. 5G illustrates apparatus 500 being decelerated from motion, such that there is acceleration associated with a horizontal axis of apparatus 500. In such an example, apparatus 500 may receive an acceleration input associated with the deceleration that the user is performing on apparatus 500. The apparatus may cause a flexural deformation representation based, at least in part, on the acceleration input. The example of FIG. 5G illustrates a flexural deformation representation in relation to the acceleration input associated with motion.

Figure 6C:
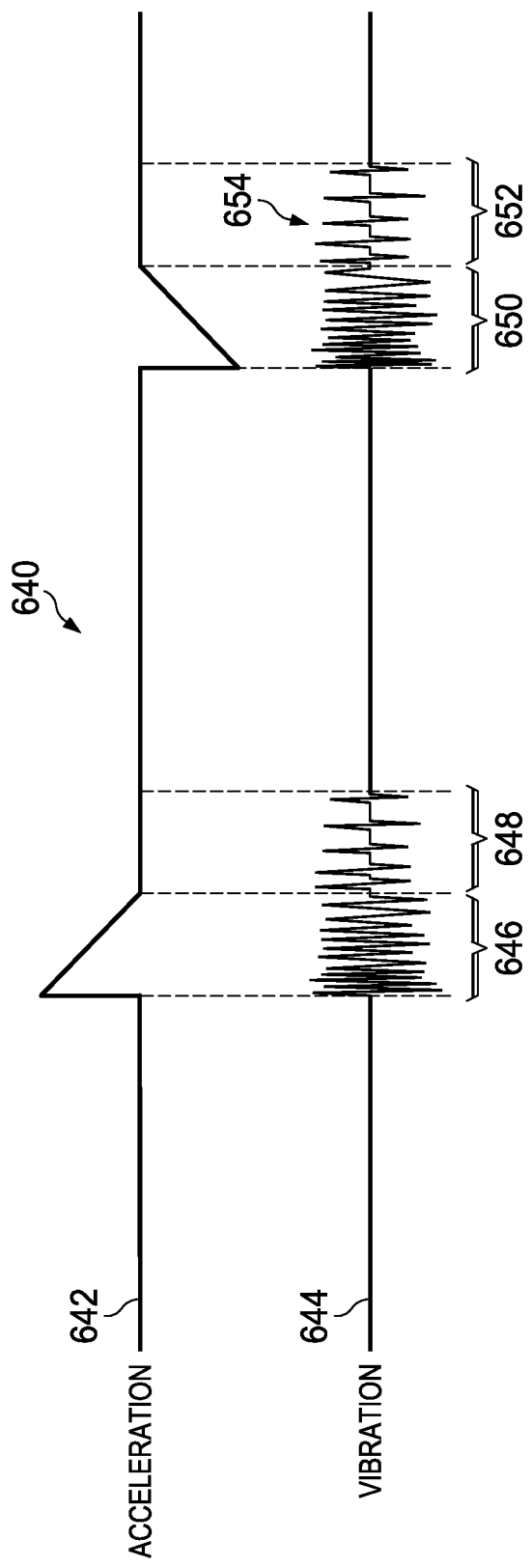

FIGS. 6A-6C are diagrams illustrating models associated with simulation of a deformation according to at least one example embodiment. The examples of FIG. 6A-6C are merely examples of models associated with simulation of a deformation, and do not limit the scope of the claims. For example, haptic indication of deformation may vary, relationships among simulation aspects may vary, and/or the like.

In at least one example embodiment, a deformation representation is based, at least in part, on an acceleration input. As previously described, the acceleration input may relate to motion, gravity, and/or the like. As previously described, a deformation representation may be indicative of physical characteristics associated with the way an apparatus reacts to forces applied to it, such as an acceleration force. The deformation representation may be modeled based, at least in part, on such reaction.

In at least one example embodiment, the apparatus may determine a deformation representation based, at least in part, on a modeled physical property of, at least part of, the apparatus, such as mass, dimensions, inertia, and/or the like. For example, the apparatus may determine an inertial force associated with an acceleration input. In at least one example embodiment, the deformation representation may be based, at least in part on a determined inertial force. For example, a higher determined inertial force may relate to a deformation representation having a higher magnitude than that of a lower determined inertial force.

In at least one example embodiment, a deformation representation comprises a responsive deformation representation. In at least one example embodiment, a responsive deformation representation relates to a deformation representation that represents deformation related to, at least part of, the apparatus being acted upon by the acceleration. For example, the apparatus 500 in the example of FIG. 5D demonstrates a responsive deformation representation associated with an acceleration of the apparatus in the direction of the thumb of hand 502. In at least one example embodiment, the responsive deformation representation relates to a deformation representation in an opposite direction to the acceleration input. In at least one example embodiment, the responsive deformation representation relates to a deformation representation having a magnitude that is proportional to a magnitude of the acceleration input and a magnitude of the deformation attribute. For example, a responsive deformation representation associated with a greater magnitude acceleration input may have a greater magnitude than a responsive deformation representation associated with a lesser magnitude acceleration input. In at least one example embodiment, the duration of the responsive deformation representation substantially coincides with duration of the acceleration input. For example, the responsive deformation representation may start at substantially the same time that in indication of the acceleration input is received, and/or end at substantially the same time that an indication of termination of the acceleration input is received. In at least one example embodiment, substantially the same or substantially coinciding relates to any deviation being within a threshold that is difficult for a user to perceive.

FIG. 6A is a diagram illustrating models associated with simulation of a deformation based on acceleration related to gravity according to at least one example embodiment. In at least one example embodiment, an apparatus determines an angle of an acceleration input that is associated with gravity, and causes a deformation representation based, at least in part, on the determined angle. As seen in the examples of FIGS. 5A-5C, as the angle of an apparatus approaches perpendicularity with gravity, the deformation representation may increase. This increase aligns with experiences that the user is familiar with. For example, a horizontal bar typically flexes more than a vertical bar.

In at least one example embodiment, the magnitude of the deformation representation is based, at least in part on an angle associated with gravity. As previously described, the magnitude of the deformation representation may be proportional to a deformation attribute of the apparatus. Therefore, in at least one example embodiment, the deformation representation may be based, at least in part, on the angle associated with the acceleration input and the deformation attribute.

Users are accustomed to objects being deformed by gravity as the angle of the object with respect to gravity changes. However, the user may also expect the deformation of the object being deformed by gravity to remain substantially the same when the angle is not changing. For example, when an object is held at a specific angle, the deformation caused by gravity may be constant. In at least one example embodiment, the apparatus provides simulation of a deformation representation based, at least in part, on change of angle in the acceleration input.

In the example of FIG. 6A, angle 602, which represents angle of the apparatus with respect to gravity, is shown in relation to vibration 604. In at least one example embodiment, vibration 604 relates to vibrations associated with simulation of a deformation representation, similarly as described regarding FIG. 4. Vibration signals associated with such simulation are represented as grains, such as grain 610. As described in FIG. 4, the time between grains, such as time period 612, may be indicative of a deformation attribute.

In the example of FIG. 6A, time period 606 relates to a time period between a user holding an apparatus as shown in FIG. 5A and the user holding the apparatus as shown in FIG. 5B. Time period 608 relates to a time period between a user holding an apparatus as shown in FIG. 5B and the user holding the apparatus as shown in FIG. 5C. The time period between time periods 606 and 608 relates to a time period in which the user continues to hold the apparatus as shown in FIG. 5B.

In the example of FIG. 6A, the apparatus causes a deformation representation in time period 606 and causes another deformation representation in time period 608. It can be seen that the deformation representation of time period 606 substantially coincides with the change in angle of the apparatus. It can be seen that the deformation representation of time period 608 substantially coincides with the change in angle of the apparatus. In this manner, the simulation of deformation representation may coincide with change in angle of the apparatus with respect to gravity. The magnitude of the deformation representation may vary proportionally with the rate of change of the angle. For example, time period 612 may be larger associated with a more rapid change in angle than that of a less rapid change in angle. As previously described in FIG. 4, the magnitude of the deformation representation may vary proportionally with the magnitude of the deformation attribute. For example, time period 612 may be larger associated with a more resistive deformation attribute than that of a less resistive deformation attribute.

FIG. 6B is a diagram illustrating models associated with simulation of a deformation based on acceleration related to motion according to at least one example embodiment.

In at least one example embodiment, an apparatus causes a deformation representation based, at least in part, on a magnitude of an acceleration input. As seen in the examples of FIGS. 5D-5G, when an apparatus is subjected to acceleration, a user may expect to experience deformation of the apparatus. This deformation aligns with experiences that the user is familiar with. For example, a bar typically flexes when accelerated at one end.

In at least one example embodiment, the magnitude of the deformation representation is based, at least in part, on magnitude of the acceleration input. As previously described, the magnitude of the deformation representation may be proportional to a deformation attribute of the apparatus. Therefore, in at least one example embodiment, the deformation representation is based, at least in part, on the magnitude of the acceleration input and the deformation attribute.

In the example of FIG. 6B, acceleration 622 is shown in relation to vibration 624. In at least one example embodiment, vibration 624 relates to vibrations associated with simulation of a deformation representation, similarly as described regarding FIG. 4. Vibration signals associated with such simulation are represented as grains, such as grain 630. As described in FIG. 4, the time between grains may be indicative of a deformation attribute.

In the example of FIG. 6B, time period 626 relates to a time period in which a user is accelerating an apparatus into motion as shown in FIG. 5D. Time period 628 relates to a time period in which a user is decelerating the apparatus from being motion as shown in FIG. 5G. The time period between time periods 626 and 628 relates to a time period in which the user keeps the apparatus in motion, as shown in FIGS. 5E and 5F.

In the example of FIG. 6B, the apparatus causes a deformation representation in time period 626 and causes another deformation representation in time period 628. It can be seen that the deformation representation of time period 626 substantially coincides with the acceleration input of the apparatus. It can be seen that the deformation representation of time period 628 substantially coincides with the deceleration input. In this manner, the simulation of deformation representation may coincide with acceleration indicated by an acceleration input. The magnitude of the deformation representation may vary proportionally with the magnitude of the acceleration input. For example, a time period between vibration grains may be larger associated with a greater magnitude acceleration input than that of a lesser magnitude acceleration input. As previously described in FIG. 4, the magnitude of the deformation representation may vary proportionally with the magnitude of the deformation attribute. For example, a time period between vibration grains may be larger associated with a more resistive deformation attribute than that of a less resistive deformation attribute.

In at least one example embodiment, the deformation representations of time periods 626 and 628 relate to a responsive deformation representation.

FIG. 6C is a diagram illustrating models associated with simulation of a deformation based on acceleration related to motion according to at least one example embodiment. In many circumstances, users may expect an object that is deformed by an acceleration force to become restored after the acceleration force terminates. For example, a user may expect a deformation as illustrated in FIG. 5D when the apparatus is subjected to acceleration, and expect restoration to an apparatus as illustrated in FIG. 5E when the apparatus is no longer being subjected to acceleration, even if the apparatus remains in motion. It may be desirable to provide a user with a deformation representation that includes such restoration.

In at least one example embodiment, the deformation representation comprises a restorative deformation representation. In at least one example embodiment, a restorative deformation representation relates to a deformation representation that indicates an apparatus returning from a previous deformation representation, such as flexing back from a flexural deformation. In at least one example embodiment, the restorative deformation representation relates to a deformation representation in an opposite direction to a responsive deformation representation. For example, if the deformation representation related to a leftward flexural deformation, the restorative deformation representation may relate to a rightward deformation representation. In at least one example embodiment, the restorative deformation representation relates to a deformation representation having a magnitude that is proportional to a magnitude of the responsive deformation representation. For example, the magnitude of the restorative deformation representation may be greater when associated with a greater magnitude responsive deformation representation than that of a lesser magnitude deformation representation. In this manner, the restorative deformation representation allows the user to relate to the proportionality between deformation and restoration that the user is accustomed to with regular physical objects.

Furthermore, as previously described, a deformation representation magnitude may be proportional to the magnitude of the deformation attribute. Therefore, in at least one example embodiment, the restorative deformation representation relates to a deformation representation having a magnitude that is proportional to a magnitude of the responsive deformation representation and a magnitude of the deformation attribute.

In many circumstances, a user may associate the amount of time it takes for an object to restore itself from a deformation with a physical characteristic of the object. For example, a more rigid object may restore itself from a flexural deformation more quickly than a less rigid object. In addition, a user may expect an object to take longer to recover from a greater deformation than from a lesser deformation. Therefore, the restorative deformation duration is proportional to a magnitude of the responsive deformation representation and a magnitude of the deformation attribute.

In at least one example embodiment, the apparatus may reserve causation of a restorative deformation representation to circumstances where the acceleration input relates to motion. For example, it may be undesirable to provide a restorative deformation representation when an angle of the apparatus with respect to gravity stops changing.

In the example of FIG. 6C, acceleration 642 is shown in relation to vibration 644. In at least one example embodiment, vibration 644 relates to vibrations associated with simulation of a deformation representation, similarly as described regarding FIG. 4. Vibration signals associated with such simulation are represented as grains, such as grain 654. As described in FIG. 4, the time between grains may be indicative of a deformation attribute.

In the example of FIG. 6C, time period 646 relates to a time period in which a user is accelerating an apparatus into motion as shown in FIG. 5D. Time period 648 relates to a time period associated with the apparatus restoring itself from deformation, for example a time period between the example of FIG. 5D and the example of FIG. 5E. Time period 650 relates to a time period in which a user is decelerating the apparatus from being motion as shown in FIG. 5G. Time period 652 relates to a time period associated with the apparatus restoring itself from deformation, for example a time period between the example of FIG. 5G and a later occurring example of FIG. 5F.

The time period between time periods 646 and 650 relates to a time period in which the user keeps the apparatus in motion, as shown in FIGS. 5E and 5F.

In the example of FIG. 6C, the apparatus causes a responsive deformation representation in time period 646 and causes another responsive deformation representation in time period 650. It can be seen that the responsive deformation representation of time period 646 substantially coincides with the acceleration input of the apparatus. It can be seen that the responsive deformation representation of time period 650 substantially coincides with the deceleration input. In this manner, the simulation of responsive deformation representation may coincide with acceleration indicated by an acceleration input. The magnitude of the responsive deformation representation may vary proportionally with the magnitude of the acceleration input. For example, a time period between vibration grains may be larger associated with a greater magnitude acceleration input than that of a lesser magnitude acceleration input. As previously described in FIG. 4, the magnitude of the responsive deformation representation may vary proportionally with the magnitude of the deformation attribute. For example, a time period between vibration grains may be larger associated with a more resistive deformation attribute than that of a less resistive deformation attribute.

In the example of FIG. 6C, the apparatus causes a restorative deformation representation in time period 648 and causes another restorative deformation representation in time period 652. It can be seen that the start of restorative deformation representation of time period 648 substantially coincides with the termination of the acceleration input of the apparatus. It can be seen that the start of the restorative deformation representation of time period 652 substantially coincides with the termination of the deceleration input. The magnitude of the restorative deformation representation may vary proportionally with the magnitude of the responsive deformation representation. For example, a time period between vibration grains may be larger associated with a greater magnitude responsive deformation representation than that of a lesser magnitude responsive deformation representation. As previously described in FIG. 4, the magnitude of the restorative deformation representation may vary proportionally with the magnitude of the deformation attribute. For example, a time period between vibration grains may be larger associated with a more resistive deformation attribute than that of a less resistive deformation attribute. In addition, the duration of time periods 648 and 650 may be based, at least in part, on the deformation attribute.

Figure 7:
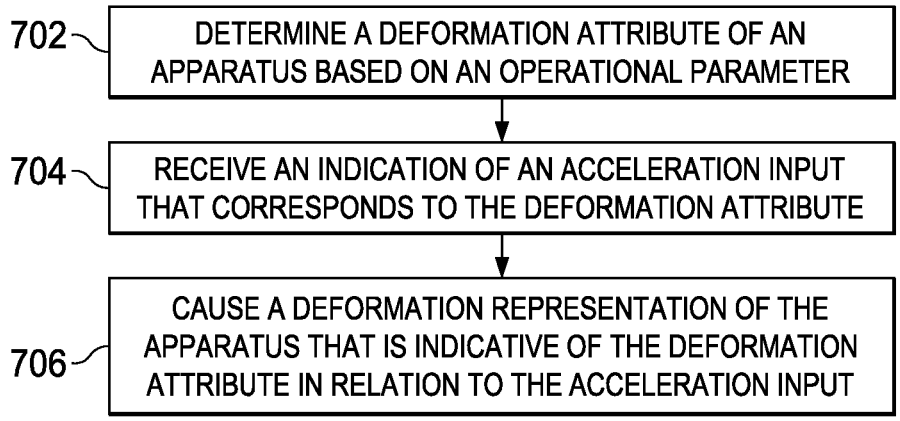
FIG. 7 is a flow diagram illustrating activities associated with causing a deformation representation according to at least one example embodiment.

FIG. 7 is a flow diagram illustrating activities associated with causing a deformation representation according to at least one example embodiment. In at least one example embodiment, there is a set of operations that corresponds the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In at least one example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus determines a deformation attribute of an apparatus based, at least in part, on at least one operational parameter. The deformation attribute and the operational parameter may be similar as described regarding FIGS. 2A-2R. The apparatus may determine the deformation attribute based on calculation, a predetermined correlation, and/or the like. For example, the apparatus may determine the deformation attribute based on a conversion calculation from an operational parameter value to a deformation magnitude.

In at least one example embodiment, the apparatus may further receive the operational parameter. For example, the operational parameter may be received from memory, from a program, from a device comprised by the apparatus, from an external apparatus, and/or the like.

At block 704, the apparatus receives an indication of an acceleration input that corresponds to the deformation attribute. The receipt, the indication, the acceleration input, and the correspondence may be similar as described regarding FIGS. 2A-2R, FIGS. 3A-3D, FIG. 4, FIGS. 5A-5G, and FIGS. 6A-6C.

At block 706, the apparatus causes a deformation representation of the apparatus, such that the deformation representation is indicative of the deformation attribute in relation to the acceleration input. The deformation representation and causation of the deformation representation may be similar as described regarding FIGS. 2A-2R, FIGS. 3A-3D, FIG. 4, FIGS. 5A-5G, and FIGS. 6A-6C.

Figure 8:
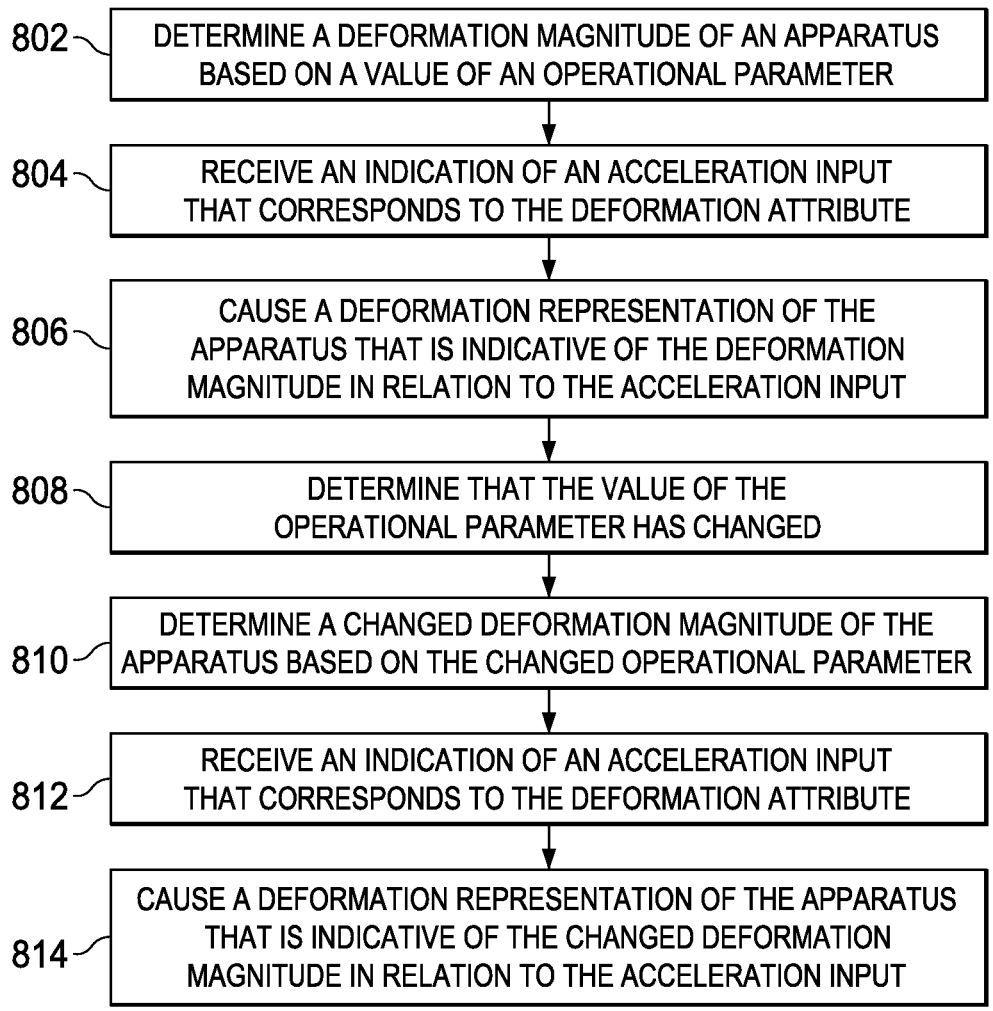
FIG. 8 is a flow diagram illustrating activities associated with causing a deformation representation according to at least one example embodiment.

FIG. 8 is a flow diagram illustrating activities associated with causing a deformation representation according to at least one example embodiment. In at least one example embodiment, there is a set of operations that corresponds the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In at least one example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

In at least one example embodiment, an operational parameter may change. In such circumstances, it may be beneficial for the deformation representation to be changed in accordance with the change in the operational parameter. For example, a battery charge level of an apparatus may change to a lower battery charge level. It may be desirable to cause a deformation representation associated with a greater deformation magnitude, based on the reduced battery charge level value.

At block 802, the apparatus determines a deformation magnitude of an apparatus based, at least in part, on at least one operational parameter value, similarly as described regarding block 702 of FIG. 7. At block 804, the apparatus receives an indication of an acceleration input that corresponds to the deformation attribute, similarly as described regarding block 704 of FIG. 7. At block 806, the apparatus causes a deformation representation of the apparatus, such that the deformation representation is indicative of the deformation magnitude in relation to the acceleration input, similarly as described regarding block 706 of FIG. 7. At block 808, the apparatus determines that the value of the operational parameter has changed. The apparatus may determine change based on a query of the operational parameter value, receipt of a notification indicating a change in the operation parameter value, comparison of the operational value to a previously determined operational value, and/or the like. At block 810, the apparatus determines a changed deformation magnitude of the apparatus based, at least in part, on the changed value of the operational parameter, similarly as described regarding block 702 of FIG. 7. At block 812, the apparatus receives another indication of an acceleration input that corresponds to the deformation attribute, similarly as described regarding block 704 of FIG. 7. At block 814, the apparatus causes a changed deformation representation of the apparatus, such that the changed deformation representation is indicative of the changed deformation magnitude in relation to the acceleration input, similarly as described regarding block 706 of FIG. 7.

Figure 9:
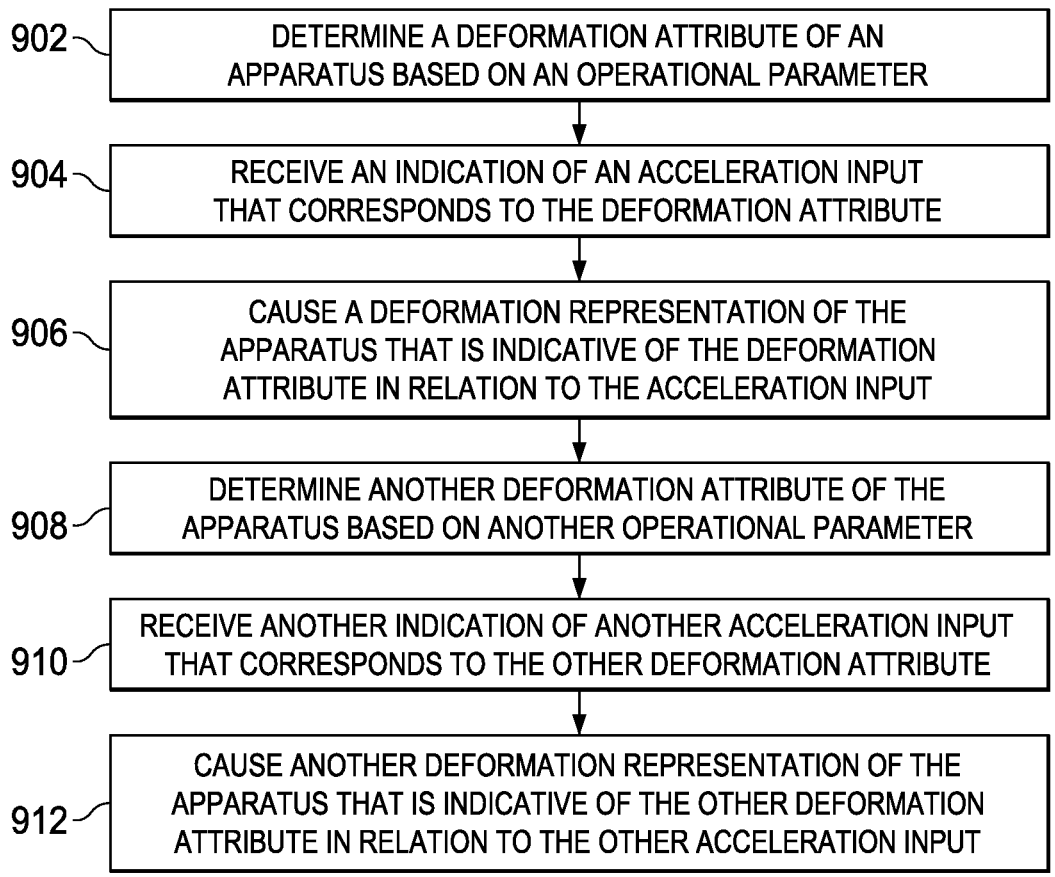
FIG. 9 is a flow diagram illustrating activities associated with causing a deformation representation according to at least one example embodiment.

FIG. 9 is a flow diagram illustrating activities associated with causing a deformation representation according to at least one example embodiment. In at least one example embodiment, there is a set of operations that corresponds to the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In at least one example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

In at least one example embodiment, an apparatus may communicate status of more than one operational parameter by way of deformation interaction. For example, the apparatus may associate a different deformation attributes with different operational parameters. For example, the apparatus may determine a deformation attribute having a direction based on an operational parameter, and determine a different deformation attribute having a different direction based on a different operational parameter. In such an example, a width-wise compression deformation representation may be indicative of a battery charge level, and a depthwise compression deformation representation may be indicative of a signal strength. Such an embodiment may be desirable for, at least, the ability to provide deformation representation interaction in association with multiple operational parameters.

In another example, the apparatus may determine a deformation attribute having a deformation classification based on an operational parameter, and determine a different deformation attribute having a different deformation classification based on a different operational parameter. In such an example, a tensile deformation representation may be indicative of a battery charge level, and a flexural deformation representation may be indicative of a signal strength. Such an embodiment may be desirable for, at least, the ability to provide deformation representation interaction in association with multiple operational parameters.

At block 902, the apparatus determines a deformation attribute of an apparatus based, at least in part, on at least one operational parameter, similarly as described regarding block 702 of FIG. 7. At block 904, the apparatus receives an indication of an acceleration input that corresponds to the deformation attribute, similarly as described regarding block 704 of FIG. 7. At block 906, the apparatus causes a deformation representation of the apparatus, such that the deformation representation is indicative of the deformation attribute in relation to the acceleration input, similarly as described regarding block 706 of FIG. 7. At block 908, the apparatus determines another deformation attribute of an apparatus based, at least in part, on at least one different operational parameter, similarly as described regarding block 706 of FIG. 7. At block 910, the apparatus receives an indication of another acceleration input that corresponds to the other deformation attribute, similarly as described regarding block 704 of FIG. 7. At block 912, the apparatus causes another deformation representation such that the other deformation representation is indicative of the other deformation attribute in relation to the acceleration input, similarly as described regarding FIGS. 2A-2R, FIGS. 3A-3D, FIG. 4, FIGS. 5A-5G, and FIGS. 6A-6C.

Figure 10:
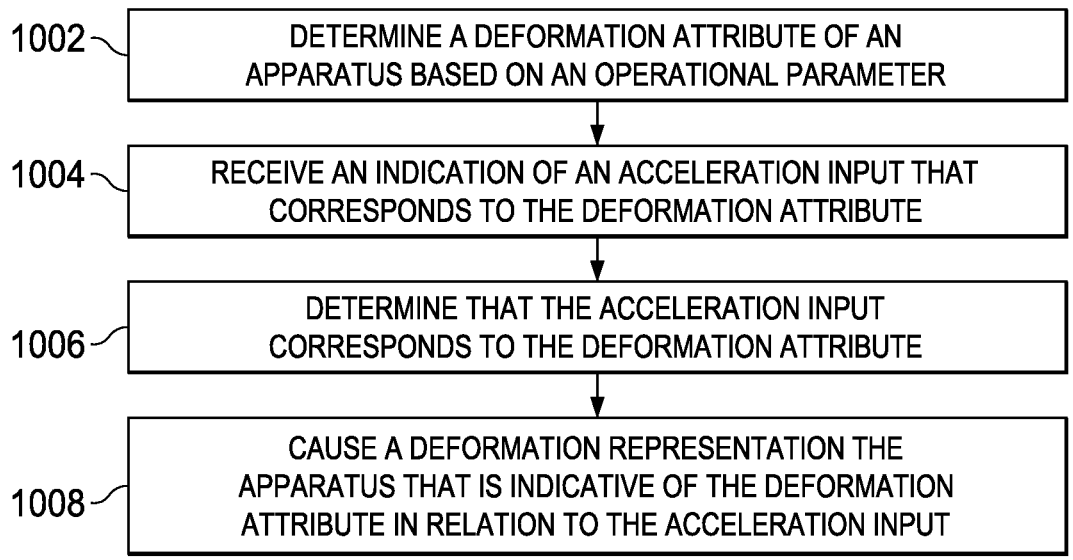
FIG. 10 is a flow diagram illustrating activities associated with causing a deformation representation according to at least one example embodiment.

FIG. 10 is yet another flow diagram illustrating activities associated with causing a deformation representation according to at least one example embodiment. In at least one example embodiment, there is a set of operations that corresponds the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In at least one example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

When causing a deformation representation in response to an acceleration input, it may be desirable to ensure that the acceleration input relates the associated deformation attribute. At block 1002, the apparatus determines a deformation attribute of an apparatus based, at least in part, on at least one operational parameter, similar as described regarding block 702 of FIG. 7. At block 1004, the apparatus receives an indication of an acceleration input that corresponds to the deformation attribute, similar as described regarding block 704 of FIG. 7. At block 1006, the apparatus determines that the indication of acceleration input corresponds to the deformation attribute. At block 1008, the apparatus causes a deformation representation of the apparatus, such that the deformation representation is indicative of the deformation attribute similar as described regarding block 706 of FIG. 7. The causation of the deformation representation may be performed in association with the determination that the indication of force input corresponds to the deformation attribute. For example, performance of block 1008 may be predicated upon the determination of block 1006. As such, performance of block 1008 may be in response to the determination of block 1006.

Figure 11:
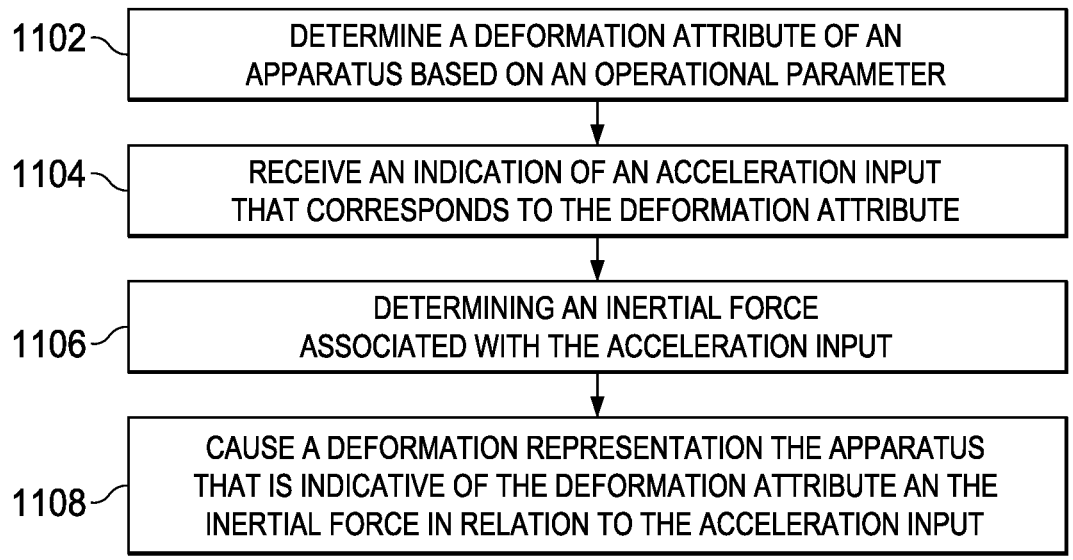
FIG. 11 is a flow diagram illustrating activities associated with causing a deformation representation according to at least one example embodiment.

FIG. 11 is a flow diagram illustrating activities associated with causing a deformation representation according to at least one example embodiment. In at least one example embodiment, there is a set of operations that corresponds to the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In at least one example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus determines a deformation attribute of an apparatus based, at least in part, on at least one operational parameter, similar as described regarding block 702 of FIG. 7. At block 1104, the apparatus receives an indication of an acceleration input that corresponds to the deformation attribute, similar as described regarding block 704 of FIG. 7. At block 1106, the apparatus determines an inertial force associated with the acceleration input. The determination and the inertial force may be similar as described regarding FIGS. 5A-5G and FIGS. 6A-6C. At block 1108, the apparatus causes a deformation representation of the apparatus, such that the deformation representation is indicative of the deformation attribute in relation to the acceleration input and the inertial force. The deformation representation and causation of the deformation representation may be similar as described regarding FIGS. 2A-2R, FIGS. 3A-3D, FIG. 4, FIGS. 5A-5G, and FIGS. 6A-6C.

Figure 12:
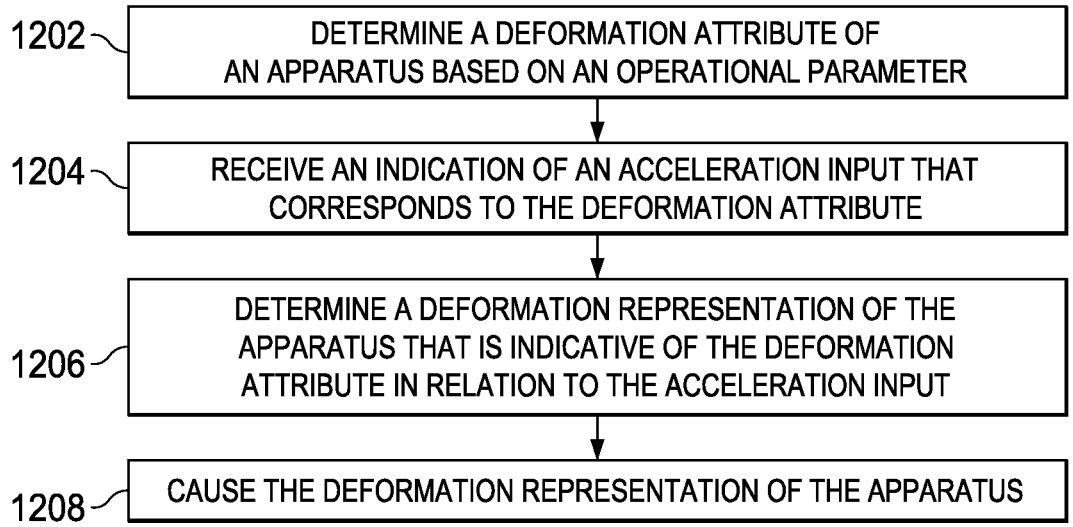
FIG. 12 is a flow diagram illustrating activities associated with causing a deformation representation according to at least one example embodiment.

FIG. 12 is a flow diagram illustrating activities associated with causing a deformation representation according to at least one example embodiment. In at least one example embodiment, there is a set of operations that corresponds to the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In at least one example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

At block 1202, the apparatus determines a deformation magnitude of an apparatus based, at least in part, on at least one operational parameter value, similarly as described regarding block 702 of FIG. 7. At block 1204, the apparatus receives an indication of an acceleration input that corresponds to the deformation attribute, similarly as described regarding block 704 of FIG. 7. At block 1206, the apparatus determines a deformation representation of the apparatus that is indicative of the deformation attribute in relation to the acceleration input. The determination and the deformation representation may be similar as described regarding FIGS. 2A-2R, FIGS. 3A-3D, FIG. 4, FIGS. 5A-5G, and FIGS. 6A-6C. At block 1208, the apparatus causes the deformation representation of the apparatus. The causation may be similar as described regarding FIGS. 3A-3D, FIG. 4, and FIGS. 6A-6C.

Figure 13:
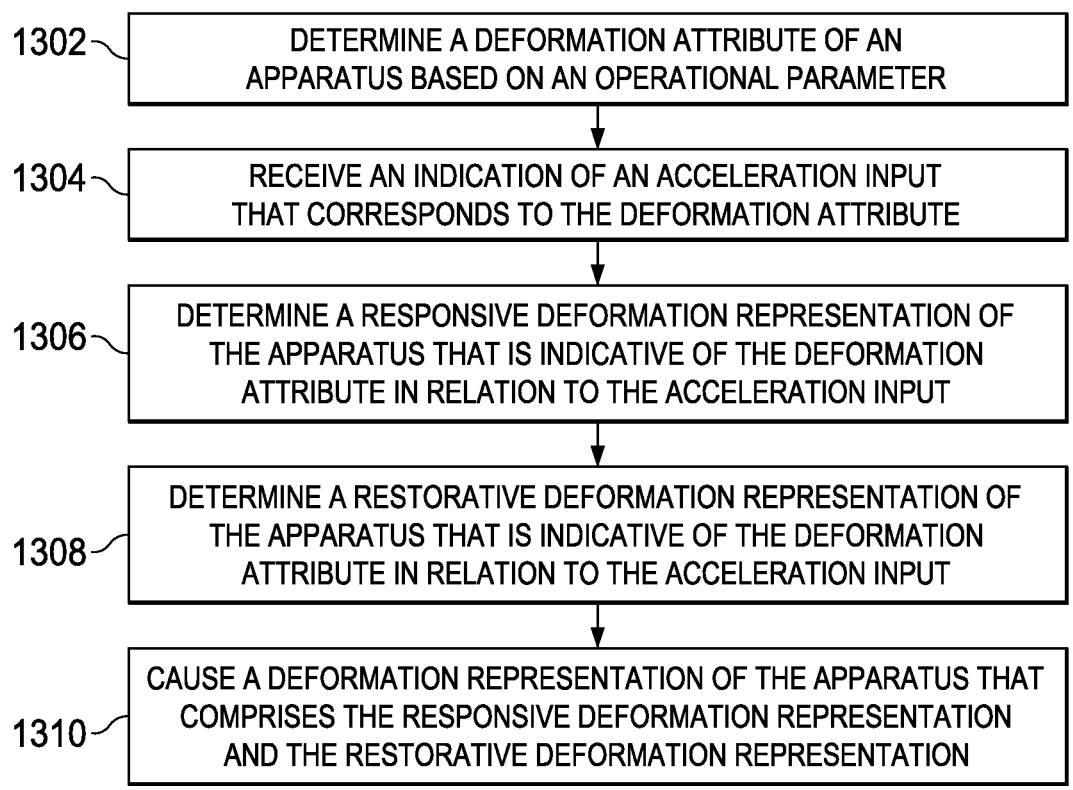
FIG. 13 is a flow diagram illustrating activities associated with causing a deformation representation according to at least one example embodiment.

FIG. 13 is a flow diagram illustrating activities associated with causing a deformation representation according to at least one example embodiment. In at least one example embodiment, there is a set of operations that corresponds to the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In at least one example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

At block 1302, the apparatus determines a deformation magnitude of an apparatus based, at least in part, on at least one operational parameter value, similarly as described regarding block 702 of FIG. 7. At block 1304, the apparatus receives an indication of an acceleration input that corresponds to the deformation attribute, similarly as described regarding block 704 of FIG. 7. At block 1306, the apparatus determines a responsive deformation representation of the apparatus that is indicative of the deformation attribute in relation to the acceleration input. The determination and the responsive deformation representation may be similar as described regarding FIGS. 2A-2R, FIGS. 3A-3D, FIG. 4, FIGS. 5A-5G, and FIGS. 6A-6C. At block 1308, the apparatus determines a restorative deformation representation of the apparatus that is indicative of the deformation attribute in relation to the acceleration input. The determination and the restorative deformation representation may be similar as described regarding FIGS. 2A-2R, FIGS. 3A-3D, FIG. 4, FIGS. 5A-5G, and FIGS. 6A-6C. At block 1310, the apparatus causes a deformation representation of the apparatus that comprises the responsive deformation representation and the restorative deformation representation. The causation may be similar as described regarding FIGS. 3A-3D, FIG. 4, and FIGS. 6A-6C.

FIG. 14 is a flow diagram illustrating activities associated with causing a deformation representation according to at least one example embodiment. In at least one example embodiment, there is a set of operations that corresponds to the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In at least one example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

At block 1402, the apparatus determines a deformation magnitude of an apparatus based, at least in part, on at least one operational parameter value, similarly as described regarding block 702 of FIG. 7. At block 1404, the apparatus receives an indication of an acceleration input that corresponds to the deformation attribute, similarly as described regarding block 704 of FIG. 7. At block 1406, the apparatus determines whether the acceleration input relates to motion. The determination may be similar as described regarding FIGS. 5A-5G. If the apparatus determines that the acceleration input relates to motion, flow proceeds to block 1414. If the apparatus determines that the acceleration input fails to relate to motion, flow proceeds to block 1408.

At block 1408, the apparatus determines a responsive deformation representation of the apparatus that is indicative of the deformation attribute in relation to the acceleration input, similarly as described regarding block 1306 of FIG. 13. At block 1410, the apparatus precludes determination of a restorative deformation representation. The preclusion may be similar as described regarding FIGS. 6A-6C. At block 1412, the apparatus causes a deformation representation of the apparatus comprising the responsive deformation representation. The causation may be similar as described regarding FIGS. 3A-3D, FIG. 4, and FIGS. 6A-6C.

At block 1414, the apparatus determines a responsive deformation representation of the apparatus that is indicative of the deformation attribute in relation to the acceleration input, similarly as described regarding block 1306 of FIG. 13. At block 1416, the apparatus determines a restorative deformation representation of the apparatus that is indicative of the deformation attribute in relation to the acceleration input, similarly as described regarding block 1308 of FIG. 13. In at least one example embodiment, determination of the restorative deformation representation is predicated on the determination that the acceleration input relates to motion. At block 1418, the apparatus causes a deformation representation of the apparatus that comprises the responsive deformation representation and the restorative deformation representation, similarly as described regarding block 1310 of FIG. 13.

Embodiments of the invention may be implemented in software, hardware, application logic or a combination of software, hardware, and application logic. The software, application logic and/or hardware may reside on the apparatus, a separate apparatus, or a plurality of separate apparatuses. If desired, part of the software, application logic and/or hardware may reside on the apparatus, part of the software, application logic and/or hardware may reside on a separate apparatus, and part of the software, application logic and/or hardware may reside on a plurality of separate apparatuses. In at least one example embodiment, the application logic, software or an instruction set is maintained on any one of various conventional computer-readable media.

If desired, the different functions discussed herein may be performed in a different order and/or concurrently with each other. For example, block 1002 of FIG. 10 may be performed after block 1004. Furthermore, if desired, one or more of the above-described functions may be optional or may be combined. For example, block 1006 of FIG. 10 may be optional and/or combined with block 706 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
a processor;
memory including computer program code, the memory and the computer program code configured to, working with the processor, cause the apparatus to:
receive, from a sensor of the apparatus, an indication of an acceleration input, wherein the indication of the acceleration input comprises a direction of the acceleration input;
determine, based on the acceleration input, an operational parameter, of a plurality of operational parameters, to output;
determine, based on the operational parameter, a deformation attribute;
determine, based on the deformation attribute and the indication of the acceleration input, a deformation representation having a magnitude corresponding to a value of the operational parameter;
in response to the acceleration input, indicate the operational parameter by actuating a vibration device of the apparatus, thereby simulating the deformation representation;
determine a restorative deformation representation in relation to the acceleration input, wherein at a termination of the acceleration input, the restorative deformation representation has a magnitude that is proportional to the magnitude of the deformation representation; and
actuate the vibration device, thereby simulating the restorative deformation representation.

2. The apparatus of claim 1, wherein the computer program code is further configured to cause the apparatus to determine that the acceleration input corresponds to the deformation attribute, and the computer program code configured to cause the apparatus to indicate the operational parameter by actuating the vibration device comprises computer program code configured to cause the apparatus to actuate the vibration device in response to the determination that the acceleration input corresponds to the deformation attribute.

3. The apparatus of claim 1, wherein the magnitude of the deformation representation is proportional to a magnitude of the acceleration input and a magnitude of the deformation attribute.

4. The apparatus of claim 1, wherein the computer program code is further configured to cause the apparatus to:
determine that the apparatus is no longer subject to acceleration.

5. The apparatus of claim 1, wherein the computer program code is further configured to cause the apparatus to determine that the acceleration input indicates motion.

6. The apparatus of claim 1, wherein the computer program code that causes the apparatus to indicate the operational parameter by actuating the vibration device comprises computer program code that causes the apparatus to determine, based on a magnitude of the acceleration input, one or more of:
a duration to actuate the vibration device,
one or more time intervals for actuating the vibration device, or
an intensity of the vibration device.

7. The apparatus of claim 1, wherein the operational parameter comprises an amount of unread messages.

8. The apparatus of claim 1, wherein the operational parameter comprises a distance to a navigation location.

9. The apparatus of claim 1, wherein the operational parameter comprises an amount of battery charge.

10. The apparatus of claim 1, wherein the operational parameter comprises a signal strength.

11. A method comprising:
receiving, from a sensor of an apparatus, an indication of an acceleration input, wherein the indication of the acceleration input comprises a direction of the acceleration input;
selecting, based on the acceleration input, an operational parameter of a plurality of operational parameters;
determining, based on the operational parameter, a deformation attribute;
determining, based on the deformation attribute and the indication of the acceleration input, a deformation representation having a magnitude corresponding to a value of the operational parameter;
in response to the acceleration input, indicating the operational parameter by actuating a vibration device of the apparatus, thereby simulating the deformation representation;
determining a restorative deformation representation in relation to the acceleration input, wherein at a termination of the acceleration input, the restorative deformation representation has a magnitude that is proportional to the magnitude of the deformation representation; and
actuating the vibration device, thereby simulating the restorative deformation representation.

12. The method of claim 11, further comprising determining that the acceleration input corresponds to the deformation attribute, and wherein the actuating the vibration device comprises actuating the vibration device in response to the determining that the acceleration input corresponds to the deformation attribute.

13. The method of claim 11, wherein the magnitude of the deformation representation is proportional to a magnitude of the acceleration input and a magnitude of the deformation attribute.

14. The method of claim 11, further comprising:
determining that the apparatus is in motion while not subject to acceleration.

15. The method of claim 11, wherein actuating the vibration device comprises determining, based on the direction of the acceleration input, one or more of:
a duration for actuating the vibration device,
one or more time intervals for actuating the vibration device, or
an intensity of the vibration device.

16. At least one non-transitory computer-readable medium encoded with instructions that, when executed by a processor, cause the processor to:
receive, from a sensor of an apparatus, an indication of an acceleration input, wherein the indication of the acceleration input comprises a direction of the acceleration input;
determine, based on the direction of the acceleration input, an operational parameter of a plurality of operational parameters;
determine, based on the operational parameter, a deformation attribute;
determine, based on the deformation attribute and the indication of the acceleration input, a deformation representation having a magnitude corresponding to a value of the operational parameter;

in response to the acceleration input, indicate the operational parameter by actuating a vibration device of the apparatus, thereby simulating the deformation representation;

determine a restorative deformation representation in relation to the acceleration input, wherein at a termination of the acceleration input, the restorative deformation representation has a magnitude that is proportional to the magnitude of the deformation representation; and actuate the vibration device, thereby simulating the restorative deformation representation.

17. The medium of claim 16, wherein the instructions further cause the processor to determine that the acceleration input corresponds to the deformation attribute, and the instructions that cause the apparatus to indicate the operational parameter by actuating the vibration device comprise instructions that cause the apparatus to actuate the vibration device in response to the determination that the acceleration input corresponds to the deformation attribute.

18. The medium of claim 16, wherein the magnitude of the deformation representation is proportional to a magnitude of the acceleration input and a magnitude of the deformation attribute.

19. The medium of claim 16, wherein the instructions further cause the processor to determine that the acceleration input indicates motion.

* * * * *